(12) United States Patent
Jorgovanovic et al.

(10) Patent No.: US 10,721,661 B2
(45) Date of Patent: Jul. 21, 2020

(54) WIRELESS DEVICE CONNECTION HANDOVER

(71) Applicant: Amazon Technologies, Inc., Seattle, WA (US)

(72) Inventors: Milos Jorgovanovic, Mountain View, CA (US); Ganesha Batta, Pleasanton, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/212,269

(22) Filed: Dec. 6, 2018

(65) Prior Publication Data
US 2020/0053611 A1 Feb. 13, 2020

Related U.S. Application Data

(63) Continuation-in-part of application No. 15/923,473, filed on Mar. 16, 2018, now Pat. No. 10,485,049.

(60) Provisional application No. 62/586,419, filed on Nov. 15, 2017.

(51) Int. Cl.
| | | |
|---|---|---|
| *H04W 36/00* | (2009.01) | |
| *H04W 36/28* | (2009.01) | |
| *H04W 36/30* | (2009.01) | |
| *H04B 17/318* | (2015.01) | |
| *H04W 4/80* | (2018.01) | |
| *H04W 28/04* | (2009.01) | |

(52) U.S. Cl.
CPC .......... *H04W 36/03* (2018.08); *H04B 17/318* (2015.01); *H04W 36/0027* (2013.01); *H04W 36/0085* (2018.08); *H04W 36/28* (2013.01); *H04W 36/30* (2013.01); *H04W 4/80* (2018.02); *H04W 28/04* (2013.01)

(58) Field of Classification Search
CPC . H04W 36/03; H04W 36/0085; H04W 36/30; H04W 36/28; H04W 36/0027; H04W 4/80; H04W 28/04; H04B 17/318
USPC .............................................. 455/575.2, 41.2
See application file for complete search history.

(56) References Cited

U.S. PATENT DOCUMENTS

| | | |
|---|---|---|
| 2010/0195539 A1 | 8/2010 | He |
| 2011/0054907 A1 | 3/2011 | Chipchase et al. |
| 2011/0250840 A1 | 10/2011 | Lee et al. |

(Continued)

OTHER PUBLICATIONS

The Examiner's attention is hereby drawn to the specification and file history of co-pending U.S. Appl. No. 15/923,473, entitled "Wireless Device Connection Handover", filed Mar. 16, 2018, which may contain information relevant to the present application.

(Continued)

*Primary Examiner* — Eugene Yun
(74) *Attorney, Agent, or Firm* — Pierce Atwood LLP

(57) ABSTRACT

A system and method includes a first device (e.g., a primary wireless in-ear device) connected to a second device (e.g., a secondary wireless in-ear device) using a first wireless connection. The first device is also connected to a third device (e.g., a smartphone or smart watch) using a second wireless connection. If the first device and second devices determine signal quality metrics corresponding to the quality of the wireless signal received by each. If the second device reports having a better signal quality, communication with the third device is handed off from the first device to the second device.

20 Claims, 18 Drawing Sheets

(56) References Cited

U.S. PATENT DOCUMENTS

| | | |
|---|---|---|
| 2012/0258661 A1 | 10/2012 | Ishii |
| 2012/0328057 A1* | 12/2012 | Kroeger ............... H04B 7/0805 375/343 |
| 2013/0316642 A1 | 11/2013 | Newham |
| 2015/0215719 A1 | 7/2015 | Turgul |
| 2015/0312862 A1 | 10/2015 | Pei |
| 2016/0219358 A1* | 7/2016 | Shaffer ............... H04R 1/1041 |
| 2017/0048631 A1 | 2/2017 | Kwon et al. |
| 2017/0164089 A1 | 6/2017 | Lee et al. |
| 2017/0264987 A1 | 9/2017 | Hong et al. |
| 2017/0289277 A1 | 10/2017 | Lee et al. |
| 2018/0338197 A1 | 11/2018 | Jeong et al. |

OTHER PUBLICATIONS

The Examiner's attention is hereby drawn to the specification and file history of co-pending U.S. Appl. No. 16/254,308, entitled "Wireless Device Connection Handover", filed Jan. 22, 2019, which may contain information relevant to the present application.

The Examiner's attention is hereby drawn to the specification and file history of co-pending U.S. Appl. No. 15/923,645, entitled "Wireless Device Connection Handover", filed Mar. 16, 2018, which may contain information relevant to the present application.

* cited by examiner

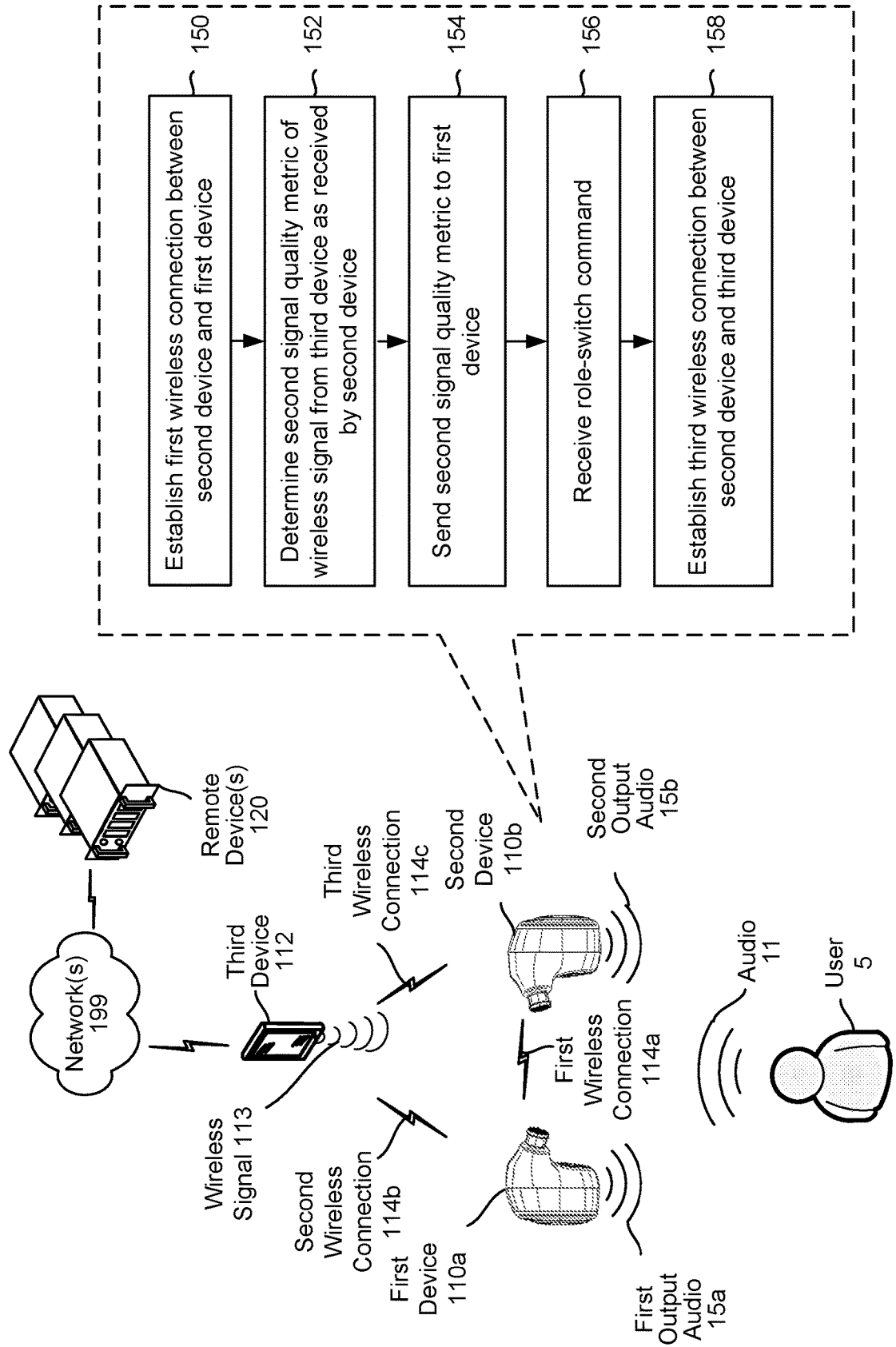

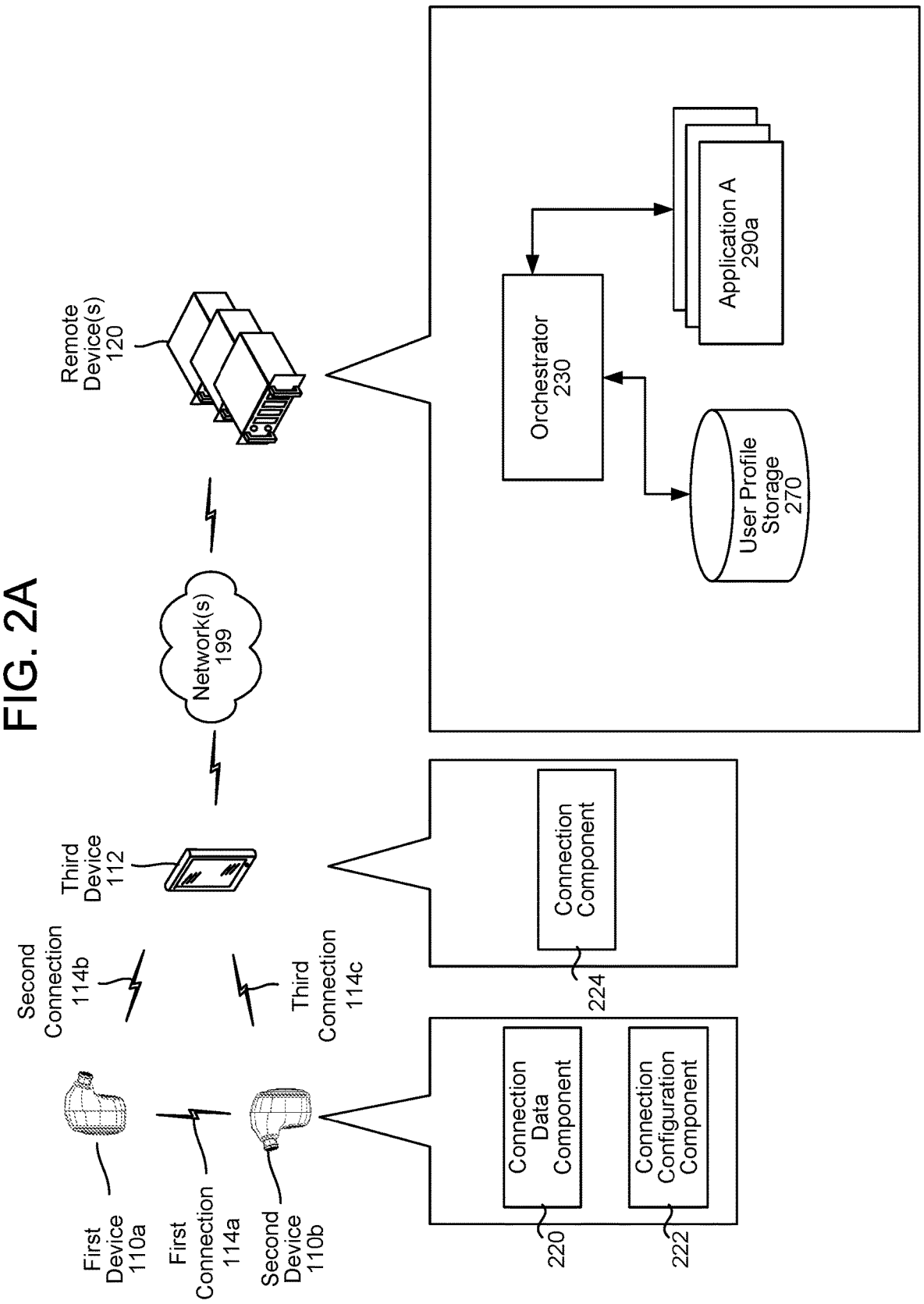

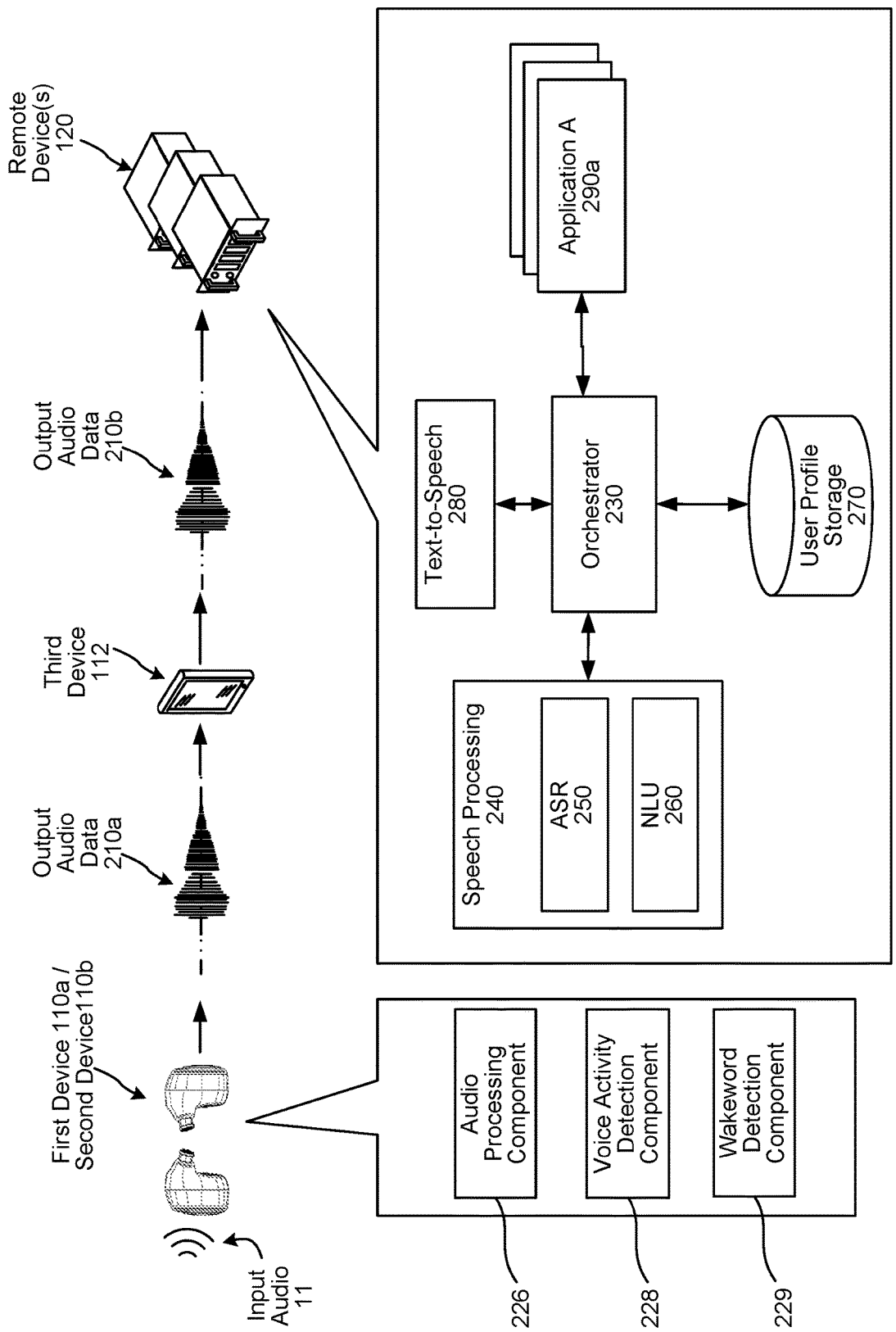

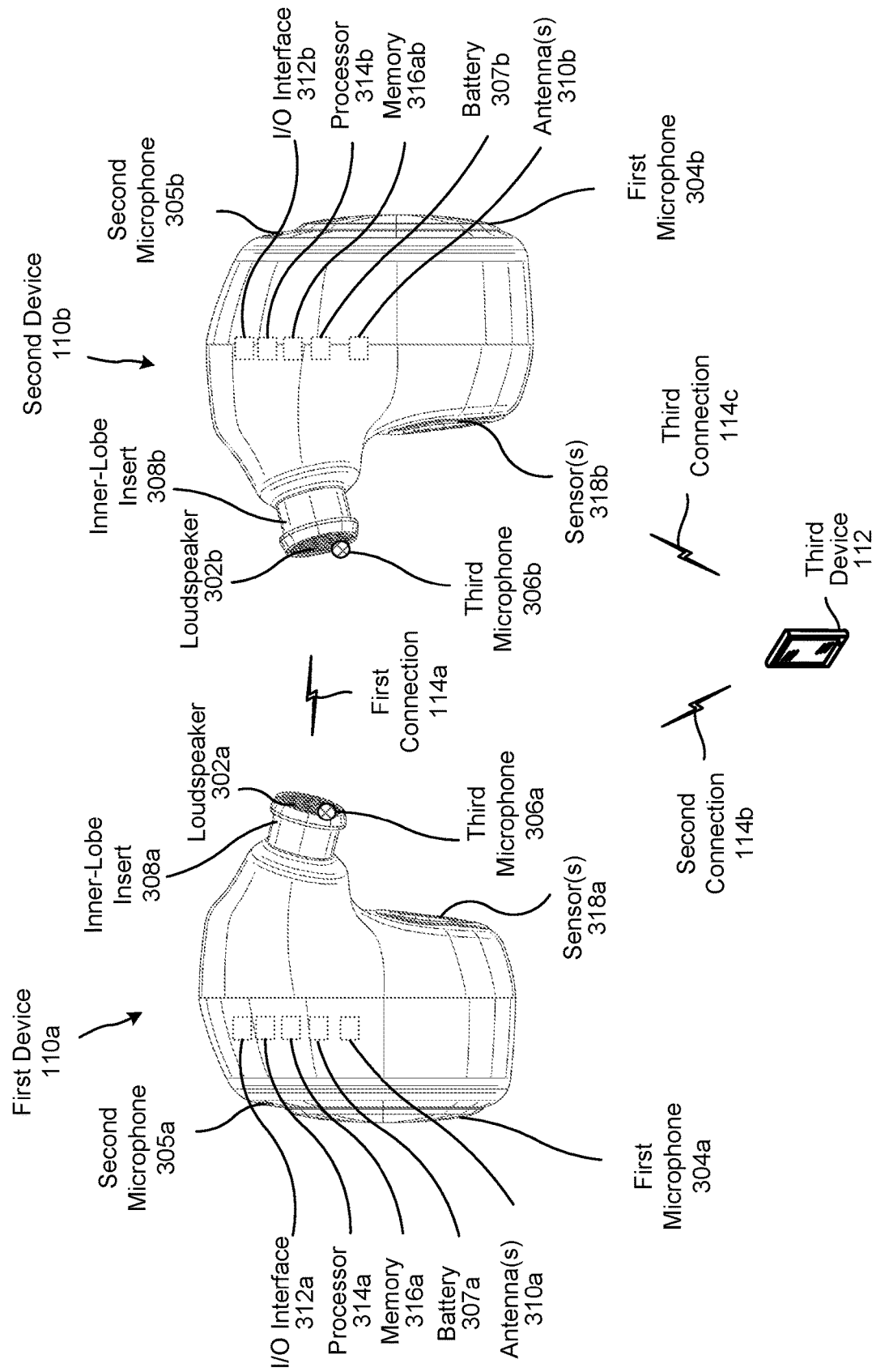

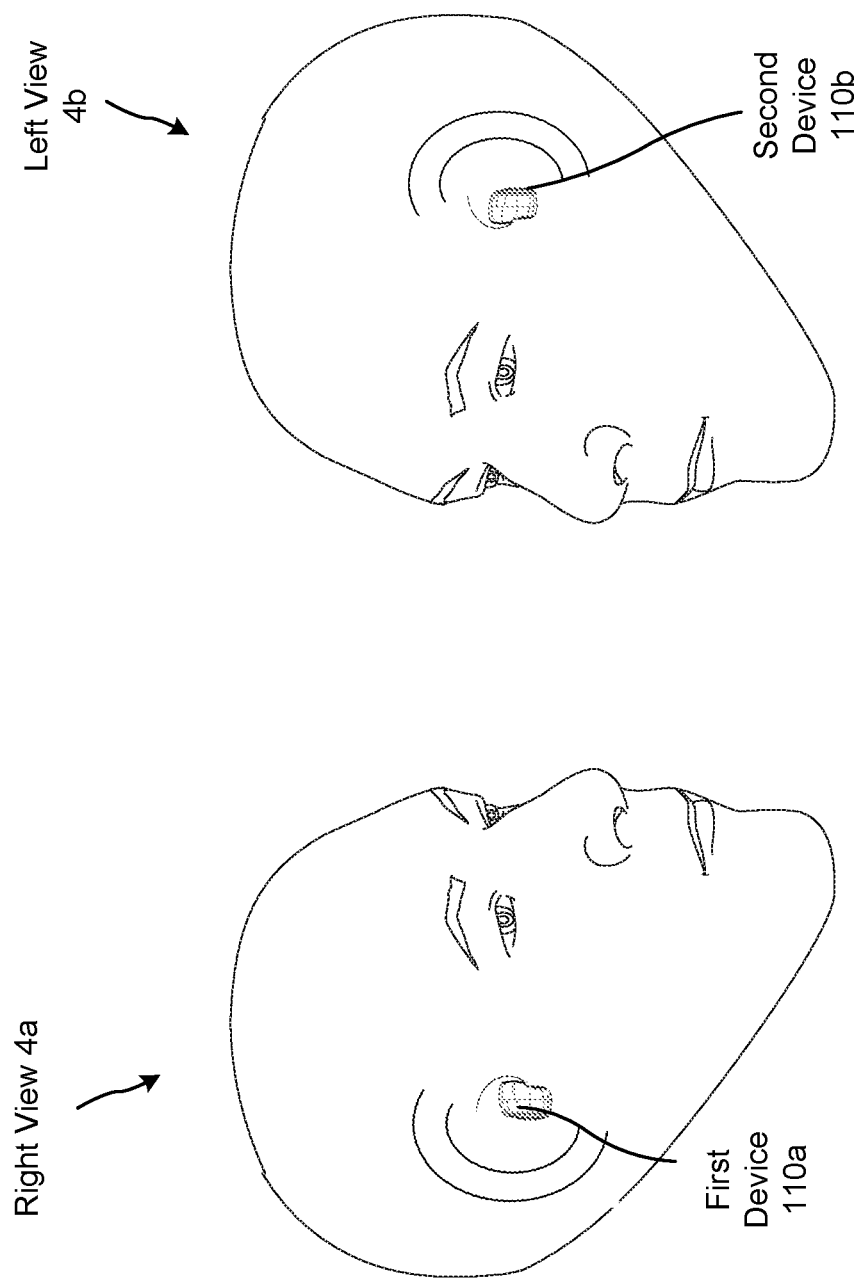

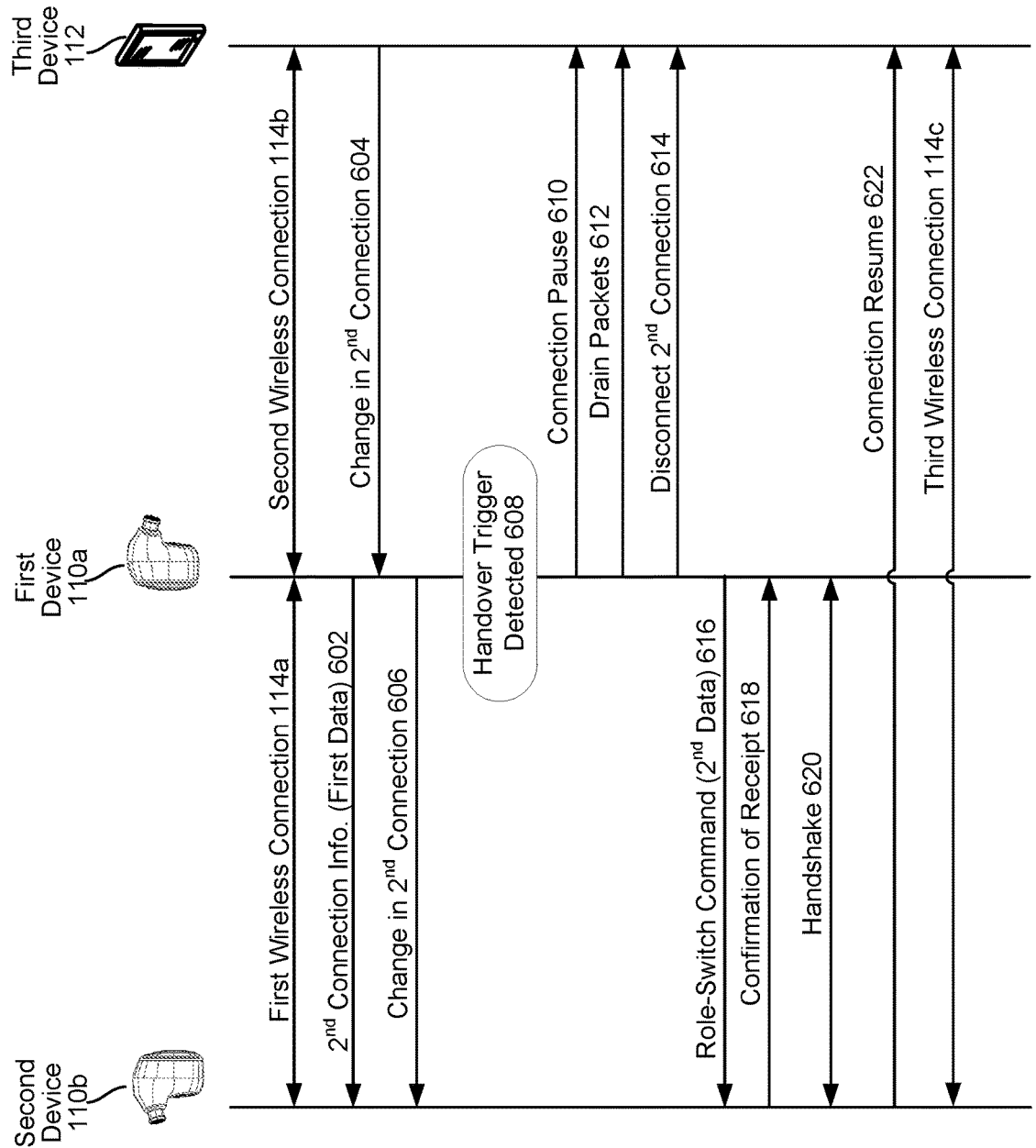

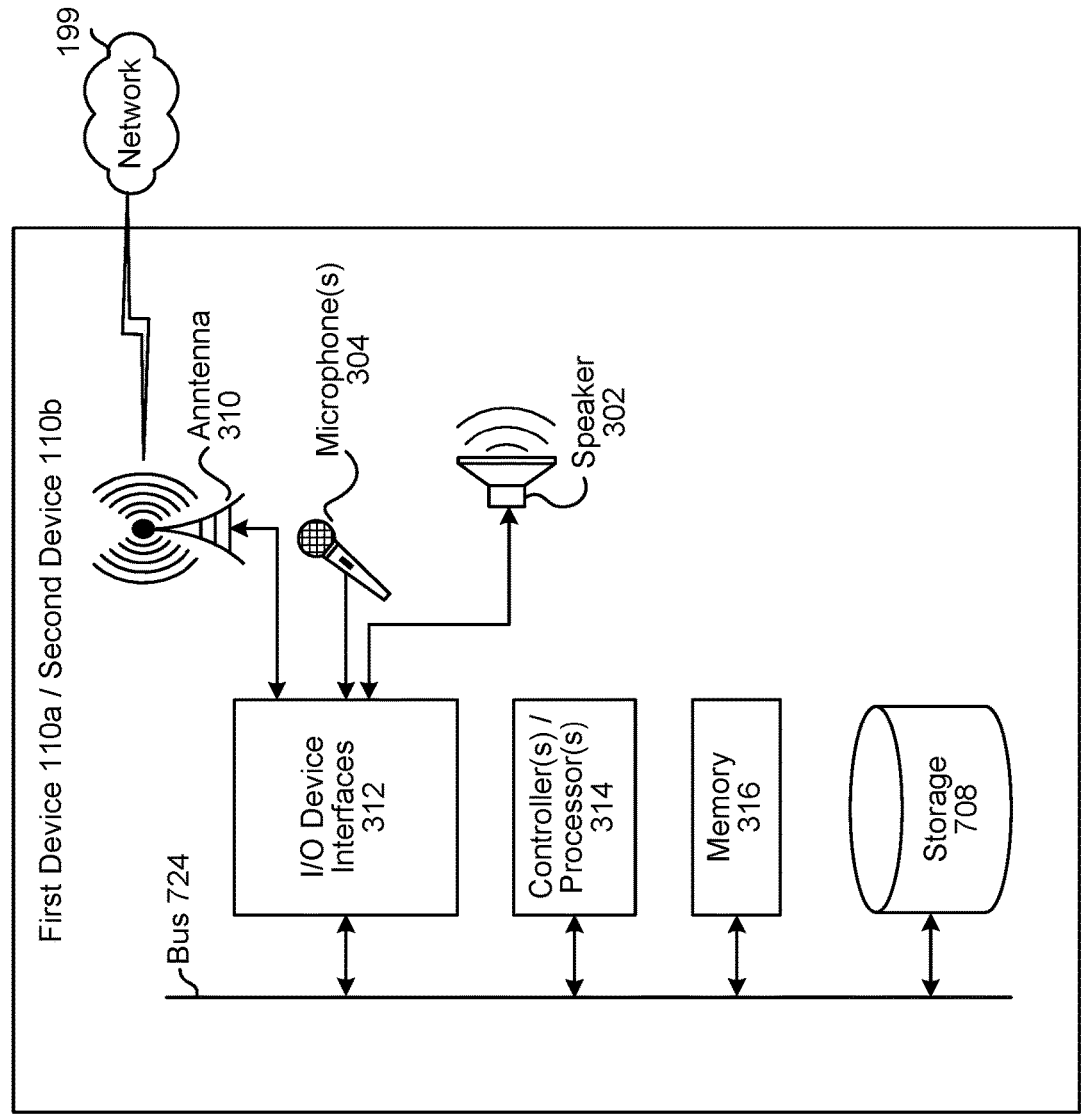

WIRELESS DEVICE CONNECTION HANDOVER

CROSS-REFERENCE TO RELATED APPLICATION

This application is a continuation-in-part of, and claims the benefit of priority of, U.S. Non-provisional patent application Ser. No. 15/923,473, filed Mar. 16, 2018 and entitled "WIRELESS DEVICE CONNECTION HANDOVER," in the names of Ganesh Batta, et al., which claims the benefit of priority of U.S. Provisional Patent Application No. 62/586,419 and entitled "WIRELESS DEVICE CONNECTION HANDOVER," filed Nov. 15, 2017, in the names of Ganesh Batta, et al. The above applications are herein incorporated by reference in their entirety.

BACKGROUND

Wireless audio in-ear devices, such as earbuds or headphones, may be used to communicate wirelessly with a user device, such as a smartphone, smartwatch, or similar device, and with each other. The wireless in-ear devices may be used to output audio sent from the user device, such as music, as part of two-way communications, such as telephone calls, and/or to receive audio for speech recognition. Speech-recognition systems have progressed to the point at which humans are able to interact with computing devices using their voices. Such systems employ techniques to detect when speech is occurring and to identify the words spoken by a human user based on the received audio input. Voice-activity detection, speech recognition, and natural-language understanding processing techniques enable speech-based user control of a computing device to perform tasks based on the user's spoken commands. The combination of voice-activity detection, speech recognition, and/or natural-language understanding processing techniques is referred to herein as speech processing. Speech processing may also involve converting a user's speech into text data, which may then be provided to various text-based software applications.

BRIEF DESCRIPTION OF DRAWINGS

For a more complete understanding of the present disclosure, reference is now made to the following description taken in conjunction with the accompanying drawings.

FIGS. 1A and 1B illustrate a system configured to handover a wireless connection according to embodiments of the present disclosure.

FIG. 2A illustrates a system configured to handover a wireless connection according to embodiments of the present disclosure.

FIG. 2B illustrates a system configured to use a voice interface according to embodiments of the present disclosure.

FIGS. 3A and 3B are conceptual diagrams of components of a wireless connection system according to embodiments of the present disclosure.

FIG. 4 is a conceptual diagram of components of a wireless connection according to embodiments of the present disclosure.

FIG. 6 illustrates a data flow relating to wireless handover according to embodiments of the present disclosure.

FIG. 7 is a block diagram conceptually illustrating example audio devices according to embodiments of the present disclosure.

DETAILED DESCRIPTION

Figure 1A:
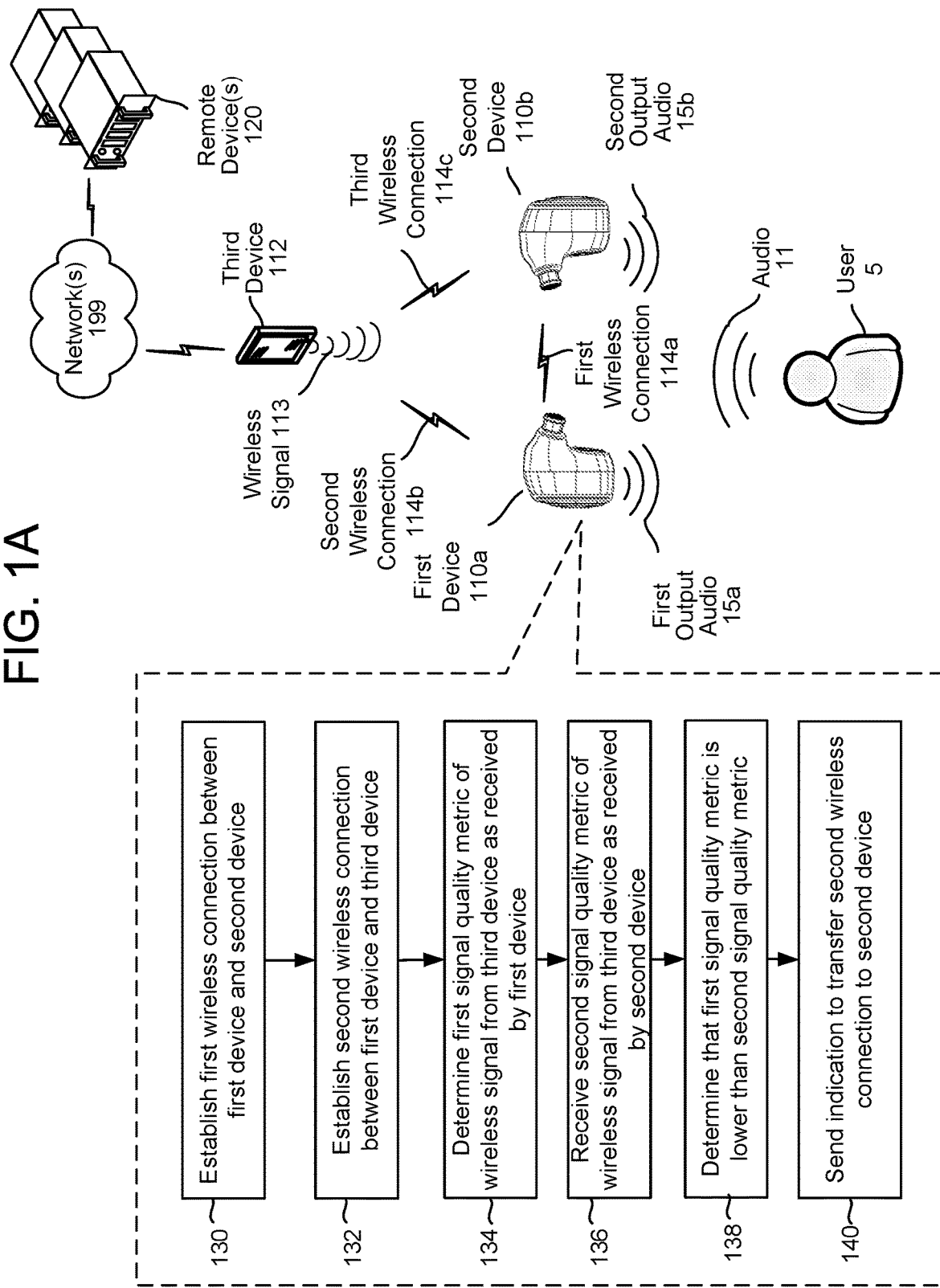

Some electronic devices may include an audio-based input/output interface. In certain situations, a user may interact with such a device—which may be, for example, a smartphone, tablet, computer, or other speech-controlled device—partially or exclusively using his or her voice and ears. Exemplary interactions include listening to music or other audio, communications such as telephone calls, audio messaging, and video messaging, and/or audio input for search queries, weather forecast requests, navigation requests, or other such interactions. The device may include one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis. The device may include an audio output device, such as a loudspeaker, for outputting audio that in some embodiments responds to and/or prompts for the voice input.

Use of the above-described electronic device may, at times, be inconvenient, difficult, or impossible. Sometimes, such as while exercising, working, or driving, the user's hands may be occupied, and the user may not be able to hold the device in such a fashion as to effectively interact with the device's audio interface. Other times, the level of ambient noise may be too high for the device to accurately detect speech from the user or too high for the user to understand audio output from the device. In these situations, the user may prefer to connect headphones to the device. As the term is used herein, "in-ear devices" may refer to any hands-free, wearable audio input/output device and includes headsets, earphones, earbuds, or any similar device. For added convenience, the user may choose wireless headphones, which communicate with the device—and optionally each other— via a wireless connection, such as Bluetooth, WI-FI, near-field magnetic induction (NFMI), LTE, or any other type of wireless connection.

In the present disclosure, for clarity, in-ear devices that communicate with both a third device and each other may referred to as "earbuds" or "wireless earbuds," but the term "earbud" does not limit the present disclosure to any particular type of wired or wireless headphones. The present disclosure may further differentiate between a "right in-ear device," meaning an in-ear device disposed in or near a right ear of a user, and a "left in-ear device," meaning an in-ear device disposed in or near a left ear of a user. A "primary" in-ear device communicates with both a "secondary" in-ear device, using a first wireless connection (such as a Bluetooth connection); the primary in-ear device further communicates with a third device (such as a smartphone, smart watch, or similar device) using a second connection (such as a Bluetooth connection). The secondary in-ear device communicates only with the primary in-ear device and does not communicate directly with the smartphone; any communication therewith passes through the primary in-ear device via the first wireless connection. In some embodiments, the primary in-ear device is a central or master Bluetooth device and the secondary in-ear device is a peripheral or slave Bluetooth device.

In the present disclosure, the primary in-ear device may be referred to as the "first device," the secondary in-ear device may be referred to as the "second device," and the smartphone or other user device may be referred to as the "third device." The primary and secondary in-ear devices may include similar hardware and software; in other instances, the secondary in-ear device contains only a subset of the hardware/software included in the primary in-ear device. If the primary and secondary in-ear devices include similar hardware and software, they may trade the roles of primary and secondary prior to or during operation as described herein. If an in-ear device takes on a primary role, it acts as the primary in-ear device as described above; if an in-ear device takes on a secondary role, it acts as the secondary in-ear device as described above. A first in-ear device may include hardware, software, firmware, or other configuration information that, upon power-on, reset, or other such event, causes the first in-ear device to initially assume the primary role. Similarly, the second in-ear device may include configuration information that causes the second in-ear device to initially assume the secondary role. As described herein, the first and second in-ear devices may each transition between the primary role and the secondary role one, two, or more times during use. The first, second, and/or third devices may communicate over a network, such as the Internet, with one or more server devices, which may be referred to as "remote device(s)."

Wireless in-ear devices, which may communicate wirelessly not only with a third device but with each other, may be more desirable and/or convenient to users because the in-ear devices do not require a wire or cord connecting them; such a cord may be distracting and/or uncomfortable. The lack of a connecting cord means, however, that each in-ear device requires its own power source, such as a battery. Such a power source is necessarily limited. Because the primary in-ear device maintains two wireless connections (one with the secondary in-ear device and one with the third device), it may consume power more quickly than the secondary in-ear device and therefore run lower on battery power more quickly. Other events may affect the use of the primary in-ear device—the user may simply remove the primary in-ear device, by design or by accident, from his or her ear, the primary in-ear device may detect a degradation in operation, or the like. In some embodiments, the in-ear device may both be in-ear and may both have adequate battery power, but the primary in-ear device may be receiving a weak wireless signal from the smartphone. Such a condition may arise when the user places the smartphone on one side of his or her body and the primary in-ear device is located on the other side of his or her body. As described herein, the secondary in-ear device may determine one or more signal quality metric(s) of a wireless signal received from the smartphone (before actually establishing a wireless connection between the secondary in-ear device and the smartphone) and may send the determined one or more signal quality metric(s) to the primary in-ear device. The primary in-ear device may determine its own one or more signal quality metric(s) of a wireless signal received from the smartphone (i.e., the wireless signal used to establish the wireless connection between the primary in-ear device and the smartphone). As described in greater detail below, if the primary in-ear device determines that its received wireless signal is weak (i.e., the one or more signal quality metric(s) are lower than corresponding thresholds) and if the secondary in-ear device's received wireless in-ear device is strong (i.e., its one or more signal quality metric(s) are higher than corresponding thresholds), the primary in-ear device may send a command to the secondary in-ear device to assume the role of primary in-ear device. The signal quality metric(s) may be a packet error rate (PER) of the signal, a received signal strength indication (RSSI) of the signal, a signal-to-noise ratio (SNR) of the signal, and/or other such metric(s).

In these situations, the smartphone and secondary in-ear device are still functional (and/or on the user's person, in the user's vicinity, etc.), but impending loss of functionality of the primary in-ear device may lead to cessation of any communication being sent or received from the in-ear devices. Because communications between the smartphone and the secondary in-ear device are sent via the primary in-ear devices, loss of or disabling of the primary in-ear device means that no further communications can be sent or received to or from the smartphone using the secondary in-ear device. Cessation of communications may be inconvenient to the user, such as if music being output by the in-ear device ceases, or may be more than inconvenient if, for example, the user was engaged in an important telephone call or relying on audio navigation directions.

The present disclosure offers a system and method for handing over communication between a primary in-ear device and a smartphone (or other device) to communication between a secondary in-ear device and the smartphone when the primary and/or secondary in-ear device detects occurrence of an event prompting the handover. Such an event is herein also referred to as a handover trigger. The primary in-ear device switches from its role as primary to a role of secondary; similarly, the secondary in-ear device switches from its role as secondary to a role of primary. As explained further below, a first wireless connection connects the primary and secondary in-ear devices. The secondary in-ear device maintains information about a second wireless connection between the primary in-ear device and the smartphone, such as stack layer information, and/or baseband-connection information. The secondary in-ear device may further maintain information about the primary in-ear device, such as its address, digital-signal processing (DSP) information, sensor-related information, state, status, and/or information related to any application executing thereon. This wireless connection information may be sent from the primary in-ear device to the secondary in-ear device; instead or in addition, the secondary in-ear device may determine the connection information by monitoring the second wireless connection. As the term is used herein, as one of skill in the art will understand, monitoring a connection refers to analyzing a network connection, such as a wireless network connection, to determine one or more attributes regarding the network, such as stack information, baseband information, or any other such information. If the primary in-ear device determines that a handover trigger occurred, it may send a role-switch command to the secondary in-ear device and may disconnect the second wireless connection; the secondary in-ear device may connect the third wireless connection. As explained in greater detail below, before disconnecting the second wireless connection, the primary in-ear device may send any pending packets to the smartphone (i.e., "drain" packets) and/or may send a command to the smartphone to pause communications (i.e., a "flow off"

command). The primary in-ear device may then send the role-switch command to the secondary in-ear device, which may, in response, send a confirmation of receipt to the primary in-ear device. Using the wireless connection information, the secondary in-ear device creates a third wireless connection with the smartphone.

FIG. 1A illustrates a system for wireless connection handoff including a first device 110a (e.g., a primary in-ear device) and a second device 110b (e.g., a secondary in-ear device). The first device 110a and the second device 110b communicate using a first wireless connection 114a, which may be a NFMI, Bluetooth, or similar connection. The first device 110a communicates with a third device 112, such as a smartphone, smart watch, or similar device, using a second wireless connection 114b established at least in part on a wireless signal 113 output by the third device 112, which may also be a Bluetooth or similar signal and connection. The present disclosure may refer to particular Bluetooth protocols, such as classic Bluetooth, Bluetooth Low Energy ("BLE" or "LE"), Bluetooth Basic Rate ("BR"), and/or Bluetooth Enhanced Data Rate ("EDR"), but the present disclosure is not limited to any particular Bluetooth or other protocol. In some embodiments, however, the first wireless connection 114a between the first device 110a and the second device 110b is a low-power connection such as BLE; the second wireless connection 114b may include a high-bandwidth connection such as EDR in addition to or instead of a BLE connection. The third device 112 communicates with one or more remote device(s) 120, which may be server devices, via a network 199, which may be the Internet, a wide- or local-area network, or any other network. The first device 110a may output first output audio 15a, and the second device 110b may output second output audio 15b. The first device 110a and second device 110b may capture input audio 11 from a user 5, process the input audio 11, and/or send the input audio 11 and/or processed input audio to the third device 112 and/or remote device(s) 120, as described in greater detail below.

In various embodiments, as also explained in greater detail below, a first wireless connection 114a is established (130) between the first device 110a and second device 110b; the first device 110a and/or second device 110b may create the first wireless connection 114a upon, for example, power-on or reset. A second wireless connection is established (132) between the first device 110a and the third device 112. The first device 110a determines (134) a first signal quality metric of the wireless signal 113 as received by the first device 110a; the second device 110b, as explained below, determines a second signal quality metric of the wireless signal 113 as received by the second device 110a; the first device 110 receives (136) the second signal quality metric from the second device 110b. The first device 110a determines (138) that the first signal quality metric corresponds to a worse signal quality than that of the second signal quality metric (i.e., the first signal quality metric is lower than the second signal quality metric). Based on the determination, the first device 110a sends (140) a role-switch command the second device 110b to establish a third wireless connection 114c.

Referring also to FIG. 1B, the second device 110b establishes (150), with optional participation of the first device 110a, the first wireless connection 114a. The second device 110b may determine (152) a second signal quality metric of the wireless signal 113 as received by the second device 110b The second device 110b sends (154) the second signal quality metric to the first device 110a. The second device 110b receives (156), from the first device 110a, a role-switch command. The second device 110b thereafter establishes (158) the third wireless connection. In some embodiments, the first device includes a first instance of an application and the second device 110b includes a second instance; the second device 110b may update the status of the second instance, using the first data, to copy the context of the first instance.

The system of FIGS. 1A and 1B may operate using various connection components as described in FIG. 2A. The various components may be located on the same or on different physical devices. Communication between various components may occur directly or across a network(s) 199. Below is a discussion of those components.

The devices 110a/110b may each include a connection data component 220 and a connection configuration component 222, which may be implemented using hardware, software, and/or firmware. In various embodiments, the connection configuration component 222 may be used to, for example, create the first wireless connection 114a between the first device 110a and the second device 110b, determine occurrence of the handover trigger, and/or establish the third wireless connection 114c. The connection data component 220 may determine and/or store configuration information regarding the second wireless connection 114b by, for example, receiving information regarding the second wireless connection 114b from the first device 110a and/or by monitoring the second wireless connection 114b. This configuration information may be used by the connection configuration component 222 to establish the third wireless connection 114c. The third device 112 may include a connection component 224 that may be used to help establish the second wireless connection 114b and/or the third wireless connection 114c. The connection component 224 may include, for example, Bluetooth connection protocols and/or an application downloaded from an application store. The remote device(s) 120 may include an orchestrator component 230. The orchestrator component 230 may include memory and logic that enables it to transmit and receive various pieces and forms of data to various components of the system. The remote device(s) 120 may include user profile storage 270 that may include, for example, information related to the devices 110a/110b, such as network identification or password information, and may include one or more speechlets/application(s) 290.

An "application," as used herein, may be considered synonymous with a "skill." A skill may be software akin to an application. That is, a skill may enable the remote device(s) 120 and/or the application server(s) to execute specific functionality in order to provide output data to the user 5. The system may be configured with more than one skill. A skill may either be executed by the remote device(s) 120 or merely associated with the remote device(s) 120 (i.e., one executed by the application server(s)).

The devices 110a/110b may monitor ambient audio to determine whether speech is present in the audio using, for example, voice-activity detection (VAD). Once a device detects speech in the audio, it may detect if a wakeword is represented in the audio. This wakeword-detection process may also be referred to as keyword detection, with the wakeword being a specific example of a keyword. To determine whether a wakeword is spoken, the device may compare captured audio data to a stored wakeword signature. The wakeword signature may correspond to a built-in word or phrase or may be programmed by the user. When the device detects a wakeword, the device may "wake" and send captured audio data to a remote system for speech processing and a determination of output content responsive to the received audio.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Thus, a spoken-language processing system may include an ASR component that receives audio input of a user utterance and generates one or more likely transcriptions of the utterance and may also include a NLU component that receives textual input, such as a transcription of a user utterance, and determines the meaning of the text in a way that can be acted upon, such as by a computer application.

A speech-processing system may be configured as a relatively self-contained system in which a single device captures audio, performs speech processing, and executes a command corresponding to the input speech. Alternatively, a speech processing system may be configured as a distributed system in which a number of different devices combine to capture audio of a spoken utterance, perform speech processing, and execute a command corresponding to the utterance. Although the present application describes a distributed system, the teachings of the present application may apply to any system configuration.

ASR and NLU can be computationally expensive; significant computing resources may be needed to perform ASR and NLU processing within a reasonable time frame. Because of this expense, a distributed computing environment may be used when performing speech processing. A typical such distributed environment may involve one or more local devices having one or more microphones being configured to capture sounds from a user speaking and convert those sounds into an audio signal or other types of data. The audio signal/data may then be sent to one or more downstream remote devices for further processing, such as converting the audio signal into an ultimate command. For example, one or more servers may combine to perform ASR, one or more servers may combine to perform NLU, and so on. The command may then be executed by one or a combination of remote and local devices depending on the command itself.

As indicated above, the system of FIGS. 1A and 1B may operate using various speech processing and other components as described in FIG. 2B. The various components may be located on the same or on different physical devices. Communication between various components may occur directly or across a network(s) 199. Below is a discussion of those components, followed by a further discussion of capturing audio.

The devices 110a/110b may each include an audio-processing component 226, a voice-activity detection component 228, a wakeword detection component 229, and/or other components. The devices 110a/110b may receive input audio 11 using an audio capture component, such as a microphone or microphone array, as explained in more detail with reference to FIGS. 3A and 3B. The audio-processing component 226 may receive the captured audio and determine audio data based thereon. In some embodiments, the audio-processing component 226 includes a hardware and/or software analog-to-digital converter that converts the analog input audio, as captured by the microphone, into a digital audio signal for inclusion in the audio data. The analog-to-digital converter may sample the input audio 11 at any of a variety of different sample rates and amplifications. The audio-processing component 226 may further include noise reduction, automatic gain control, or any other such audio processing hardware or software. The audio-processing component 226 may include an encryption and/or compression component to encrypt and/or compress the audio data; the encryption and/or compression may conform to an industry standard, such as Bluetooth.

The voice-activity detection component 228 may monitor the input audio 11 to determine whether speech is present. For example, the voice-activity detection component 228 may analyze various quantitative aspects of the audio data, such as, for example, the spectral slope between one or more frames of the audio, the energy levels of the audio in one or more spectral bands, the signal-to-noise ratios of the audio in one or more spectral bands, and/or other quantitative aspects. In some instances, the voice-activity detection component 228 may use a trained classifier configured to distinguish speech from background noise. The classifier may be implemented using linear classifiers, support vector machines, and/or decision trees. The voice-activity detection component 228 may apply techniques using, for example, a Hidden Markov Model (HMM) or a Gaussian Mixture Model (GMM) to compare the audio data to one or more acoustic models in speech storage; the acoustic models may include models corresponding to speech, noise (e.g., environmental noise or background noise), and/or silence. The voice-activity detection component 228 may "trigger" when it determines that speech is present in the audio and may transmit notification of the trigger to, for example, the audio-processing component 226, the wakeword detection component 229, another device 110a/110b, and/or the third device 112.

The wakeword detection component 229 may process input the audio data—continuously, at intervals, and/or in response to a notification of the triggering of the VAD component—to determine if a keyword (e.g., a wakeword) is present in the audio data. In some embodiments, however, such as telephone calls or other such communications, no wakeword is needed or expected. Following detection of a wakeword, the devices 110a/110b may output audio data 210a, which may include at least a portion of the audio data, to the third device 112, which may in turn send corresponding output audio data 210b to the remote device(s) 120. The output audio data 210a may at least partially correspond to input audio 11 captured subsequent to input audio corresponding to the wakeword. That is, the input audio data may correspond to a spoken command that follows a spoken wakeword and optionally includes the spoken wakeword.

The wakeword detection component 229 may compare audio data to stored models or data to detect a wakeword. One approach for wakeword detection applies general large-vocabulary continuous speech-recognition (LVCSR) systems to decode the audio signals, with wakeword searching conducted in the resulting lattices or confusion networks. LVCSR decoding may, however, require relatively high computational resources. Another approach for wakeword detection builds HMMs for each wakeword and non-wakeword speech signals respectively. The non-wakeword speech includes other spoken words, background noise, etc. There may be one or more HMMs built to model the non-wakeword speech characteristics, which are named filler models. Viterbi decoding may be used to search the best path in the decoding graph, and the decoding output may be further processed to make the decision on keyword presence. This approach may be extended to include discriminative information by incorporating a hybrid DNN-HMM decoding framework. In another example, the wakeword detection component 229 may be built on deep neural network (DNN)/recursive neural network (RNN) structures without using a HMM. Such a wakeword detection component 229 may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Upon receipt by the remote device(s) 120, the output audio data 210b or other data may be sent to the orchestrator component 230. The orchestrator component 230 may include memory and logic that enables it to transmit and receive various pieces and forms of data to various components of the system. The orchestrator component 230 may send the output audio data 210b to a speech-processing component 240. An ASR component 250 of the speech processing component 240 may transcribe the output audio data 210b into text data representing one more hypotheses representing a spoken command represented in the output audio data 210b. The ASR component 250 may interpret the spoken command represented in the output audio data 210b based on a similarity between the spoken command and pre-established language models. For example, the ASR component 250 may compare the output audio data 210b with models for sounds (e.g., acoustic units such as phonemes, senons, etc.) and sequences of sounds to identify words that match the sequence of sounds corresponding to the spoken command represented in the output audio data 210b. The ASR component 250 may send the text data generated thereby to an NLU component 260 of the speech processing component 240. The text data sent from the ASR component 250 to the NLU component 260 may include a top-scoring hypothesis or may include an N-best list including multiple hypotheses. An N-best list may additionally include a score associated with each hypothesis represented therein. Each score may indicate a confidence of ASR processing performed with respect to the hypothesis with which it is associated. While FIGS. 2A and 2B illustrate components of the remote device(s) 120 communicating via the orchestrator component 230, one skilled in the art will appreciated that various components of the remote device(s) 120 may communication directly.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 may determine an intent of the command represented in the text data (e.g., an action that a user desires be performed) and/or pertinent pieces of information in the text data that allow a device (e.g., the devices 110a/110b, the remote device(s) 120, etc.) to execute the intent. For example, if the text data corresponds to "call mom," the NLU component 260 may determine that the user intended to activate a telephone application on his/her device and to initiate a call with a contact matching the entity "mom."

The remote device(s) 120 may also include various speechlets/applications 290. It should be appreciated that the remote device(s) 120 may additionally or alternatively communicate with one or more application servers executing third-party applications. The speechlets/applications 290 may include, for example, shopping applications, mapping applications, weather applications, taxi or car-sharing applications, or the like. In some embodiments, the applications 290 include communications applications such as telephone applications, voice-over-IP applications, or similar applications; if these applications are used, the orchestrator component may send the output audio data 210a there and not to the speech-processing component 240.

The remote device(s) 120 may include a TTS component 280 that generates audio data from text data using one or more different methods. In one method of synthesis called unit selection, the TTS component 280 matches text data against a database of recorded speech. The TTS component 280 may select matching units of recorded speech matching the text data and concatenates the units together to form audio data. In another method of synthesis, called parametric synthesis, the TTS component 280 varies parameters such as frequency, volume, and noise to create audio data including an artificial speech waveform. Parametric synthesis uses a computerized voice generator, sometimes called a vocoder.

FIGS. 3A and 3B illustrate additional features of an embodiment of the first device 110a and second device 110b, respectively. As shown, the first device 110a and second device 110b have similar features; in other embodiments, as noted above, the second device 110b (i.e., the secondary device) may have only a subset of the features of the first device 110a. As illustrated, the first device 110a and second device 110b are depicted as wireless in-ear devices having an inner-lobe insert; as mentioned above, however, the present disclosure is not limited to only wireless in-ear devices, and any wearable audio input/output system, such as a headset, over-the-ear headphones, or other such systems, is within the scope of the present disclosure.

The devices 110a/110b may include a loudspeaker 302a/302b, and one or more external microphone(s) (such as first microphones 304a/304b and second microphones 305a/305b), and/or one or more internal microphones (such as third microphones 206a/206b). The loudspeaker 302a/302b may be any type of loudspeaker, such as an electrodynamic loudspeaker, electrostatic loudspeaker, diaphragm loudspeaker, or piezoelectric loudspeaker; the microphones 304a/304b/305a/305b/306a/306b may be any type of microphones, such as piezoelectric or MEMS microphones. Each device 110a/110b may include one or more microphones 304a/304b/305a/305b/306a/306b.

The loudspeaker 302a/302b and microphones 304a/304b/305a/305b/306a/306b may be mounted on, disposed on, or otherwise connected to the device 110a/110b. The devices 110a/110b further include an inner-lobe insert 308a/308b that may bring the loudspeaker 302a/302b and/or third microphones 306a/306b closer to the eardrum of the user and/or block some ambient noise.

One or more additional components may be disposed in or on the devices 110a/110b. One or more batteries 307a/307b may be used to supply power to the devices 110a/110b. One or more antennas 310a/310b may be used to transmit and/or receive wireless signals over the first wireless connection 114a and/or second connection 114b; an I/O interface 312a/312b contains software and hardware to control the antennas 310a/310b and transmit signals to and from other components. A processor 314a/314b may be used to execute instructions in a memory 316a/316b; the memory 316a/316b may include volatile memory (e.g., random-access memory) and/or non-volatile memory or storage (e.g., flash memory). One or more sensors 318a/318b, such as accelerometers, gyroscopes, or any other such sensor may be used to sense physical properties related to the devices 110a/110b, such as orientation; this orientation may be used to determine whether either or both of the devices 110a/110b are currently disposed in an ear of the user (i.e., the "in-ear" status of each device). The instructions may correspond to the audio-processing component 226, voice-activity detection component 228, wakeword detection component 229, and/or other components discussed above. FIG. 4 illustrates a right view 4a and a left view 4b of a user of the first device 110a and the second device 110b.

Figure 5A:
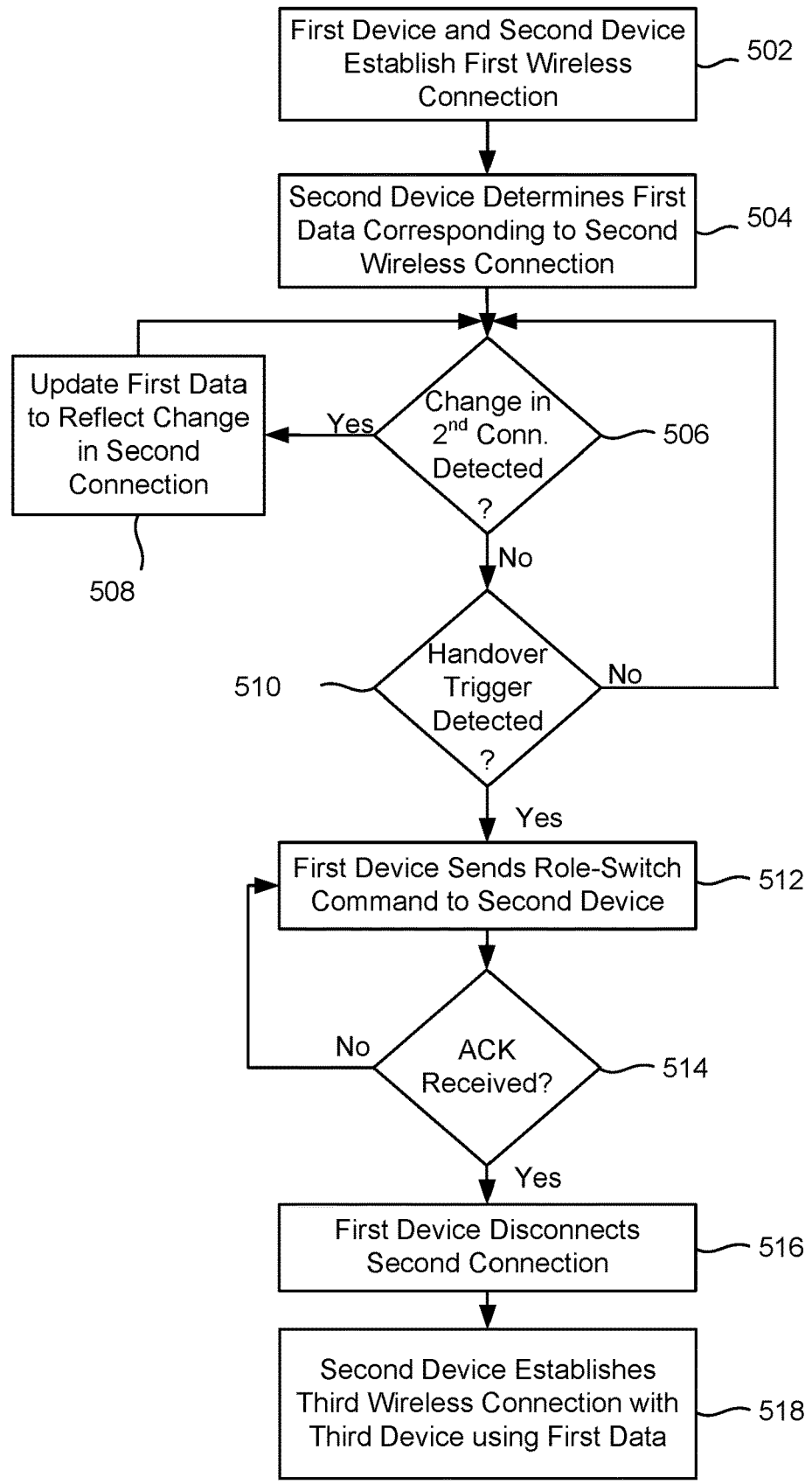
FIGS. 5A-5G illustrates process flows for wireless handover according to embodiments of the present disclosure.
Figure 5B:
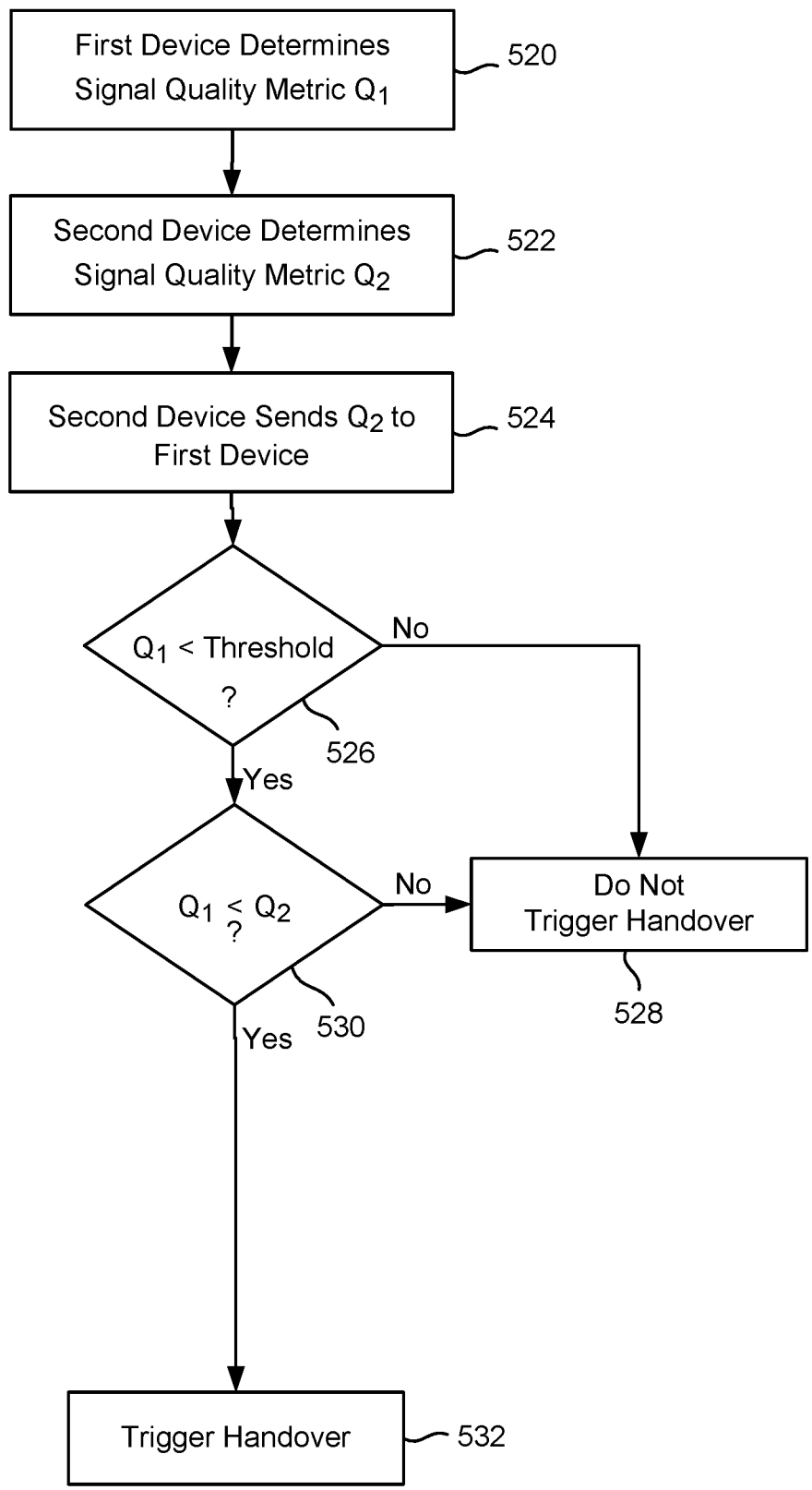
Figure 5C:
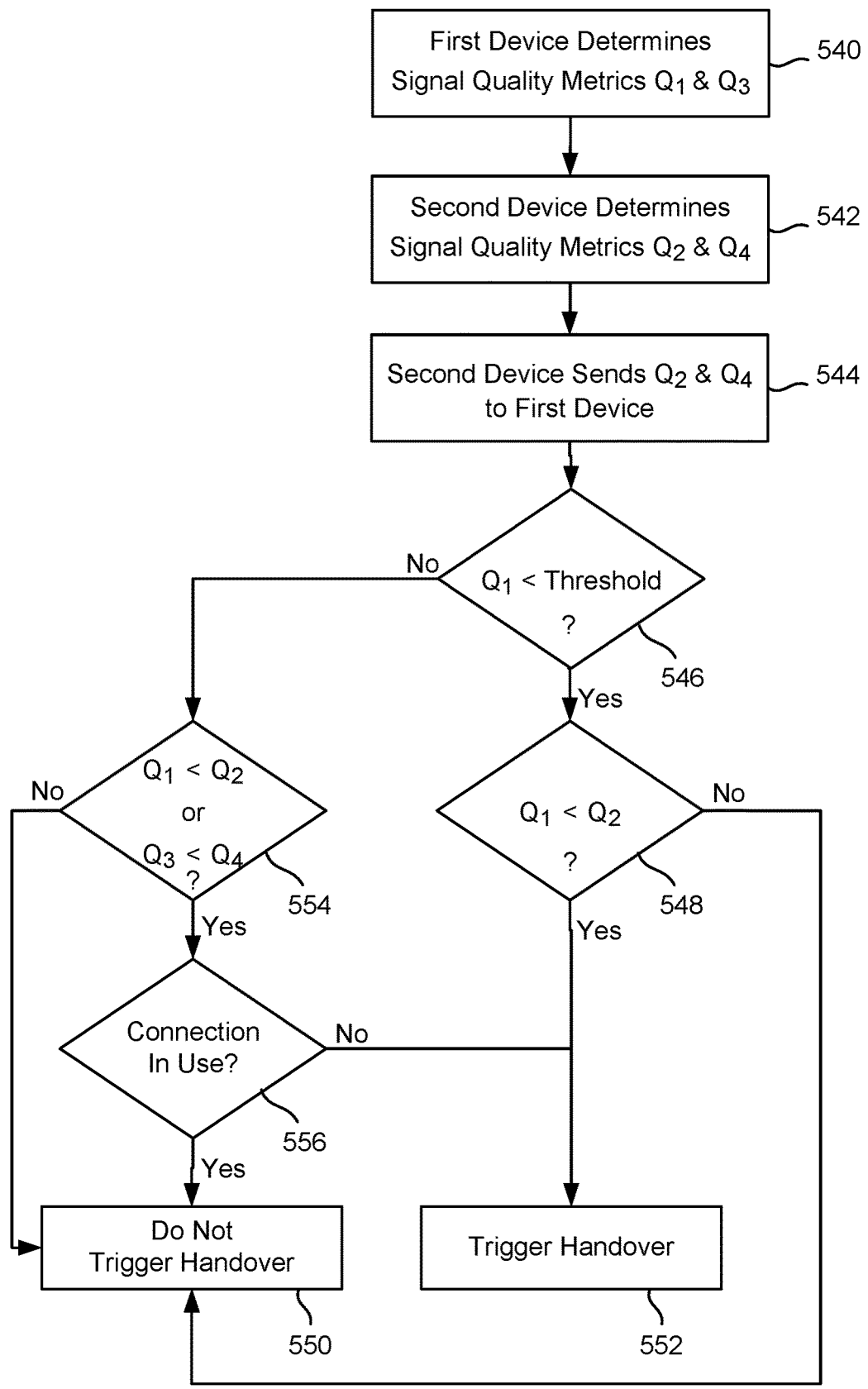
Figure 5D:
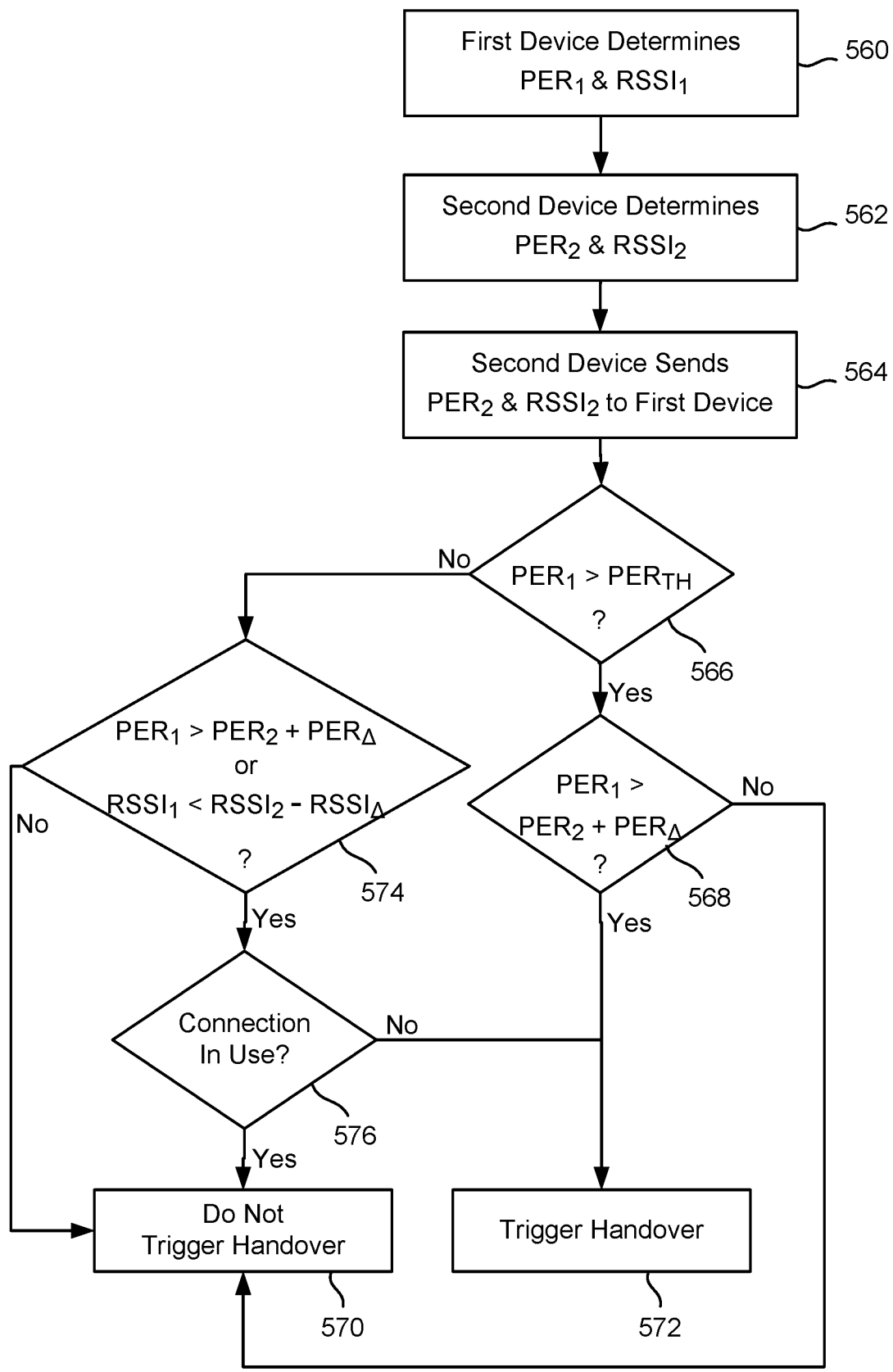
Figure 5E:
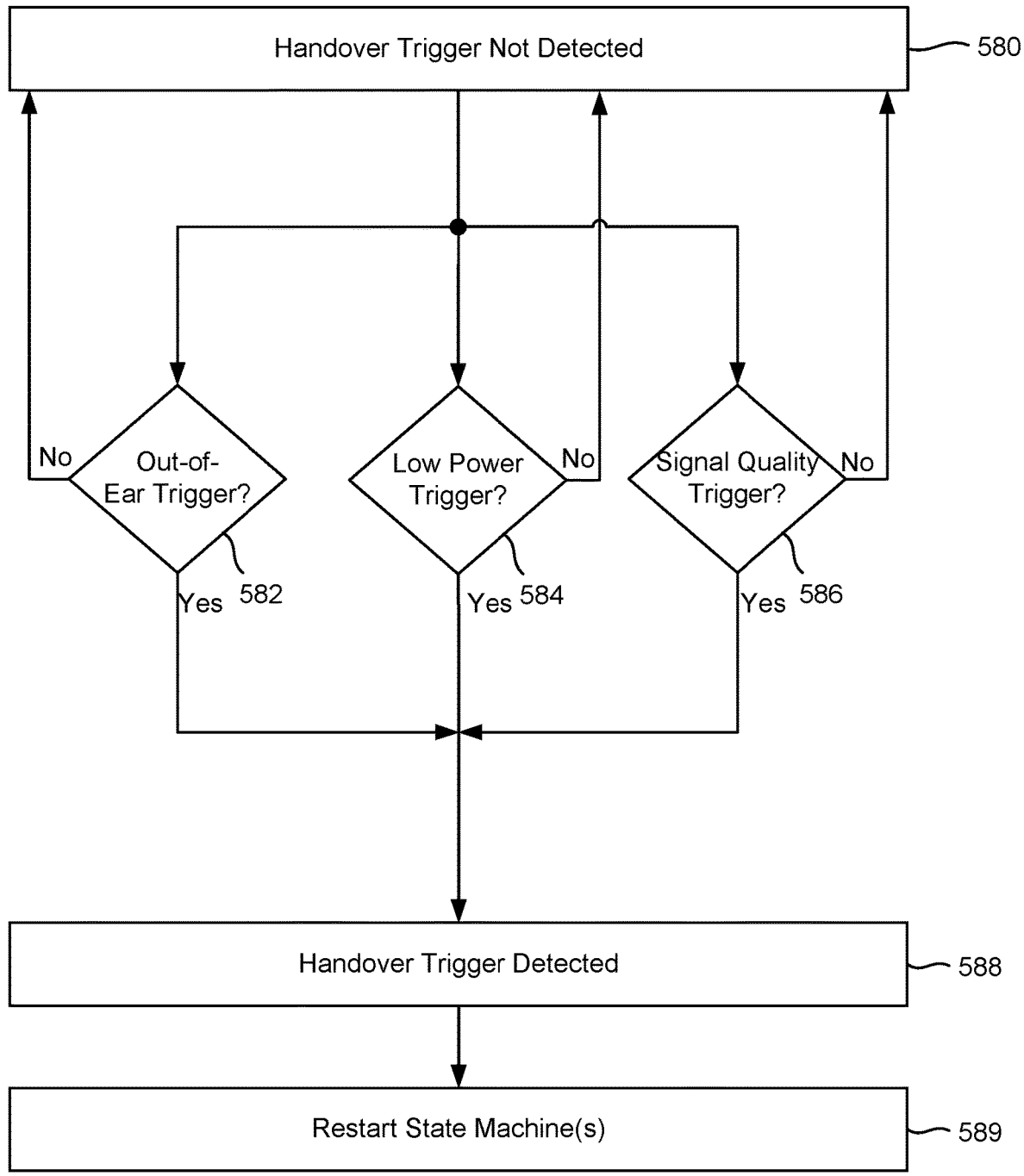
Figure 5F:
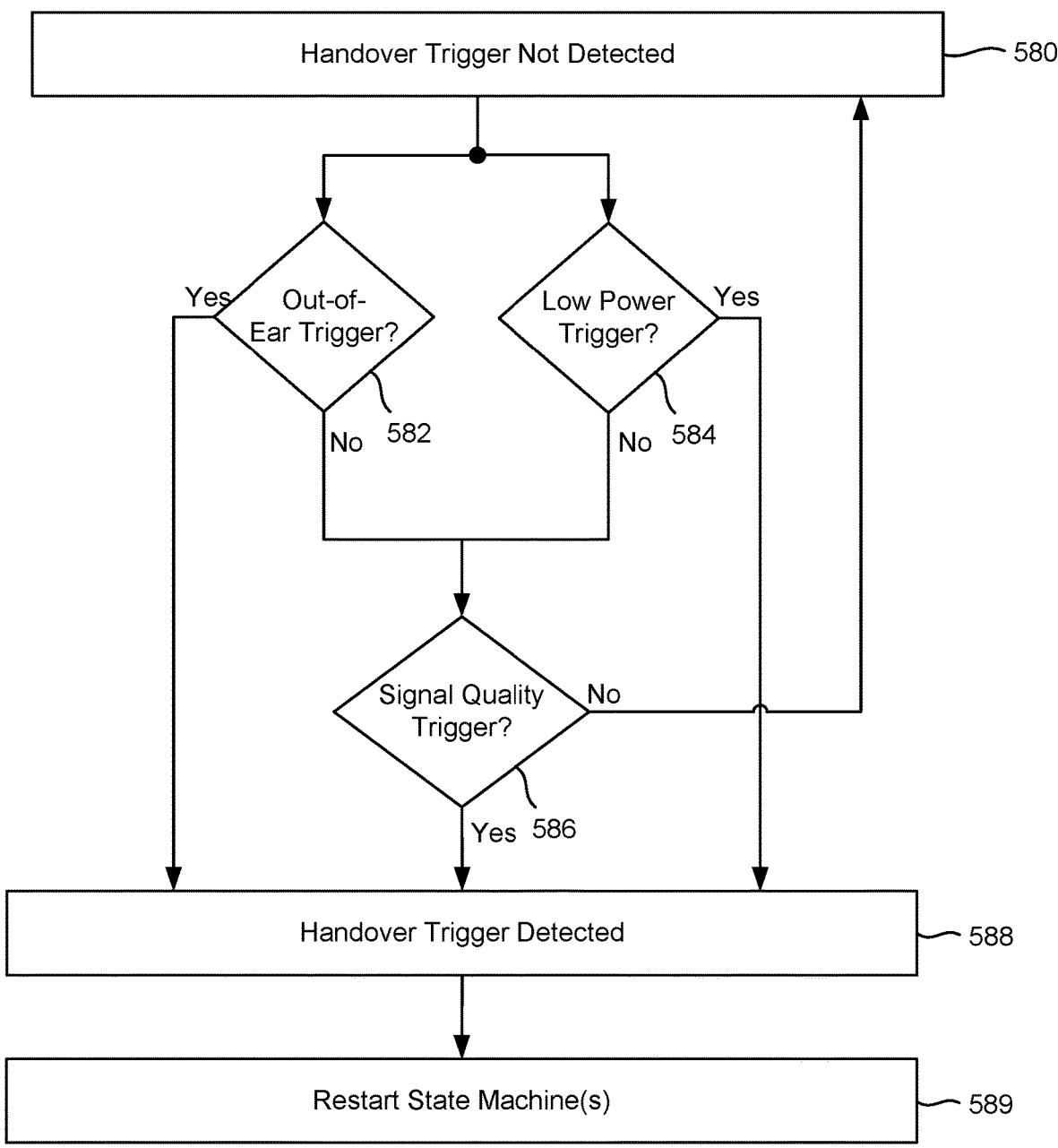

FIGS. 5A-5F and 6 illustrate process flows in accordance with the present disclosure. FIG. 5A is a process flow corresponding to an embodiment in which the second device 110b establishes a third wireless connection 114c with the third device 112. FIGS. 5B, 5C, and 5D are process flows corresponding to embodiments in which a handoff may be triggered by comparing signal quality metrics determined by the first device 110a and the second device 110b. FIGS. 5E and 5F are process flows corresponding to embodiments in which other handoff triggers, such as those based on out-of-ear status and battery power level, are considered. FIG. 6 is a process flow illustrating data movement between the first device 110a, second device 110b, and third device 112. Each of these process flows is discussed below in greater detail.

Referring again to FIG. 5A, the first device 110a and second device establish (502) the first wireless connection 114a. The first wireless connection 114 may be, as mentioned above, a Bluetooth connection such as a BLE connection, and may be established when the first device 110a and/or second device 110b power on and/or in response to a command from the third device 112. The first device 110a may, for example, broadcast an advertisement to the second device 110b, and the second device 110b may respond thereto. As mentioned above, the first device 110a and the second device 110b may include similar hardware and software but may each include configuration information that assigns roles of primary and secondary thereto upon power-on or reset. Any type of connection-establishing messages, handshaking, or other such process for establishing the first wireless connection 114a is within the scope of the present disclosure.

The second device 110b determines (504) first data corresponding to the second wireless connection 114b between the first device 110a and the third device 112. As mentioned above, the first device 110a may simply send this first data to the second device 110b and/or the second device 110b may determine the first data by monitoring the second wireless connection 114b. The first data may include, for example, network-stack information, baseband-connection information, or any other such information. Specifically, the first data may include the address of the first device 110a and/or third device 112, which may be a Bluetooth device address (BDA), and one or more security credentials associated with the third device 112, which may include a link key, a BLE long-term key, a BLE identity-resolution key, or any other such credential. The first data may further include a service discovery protocol (SDP) record and/or logical-link control and adaptation protocol (L2CAP) channel information, such as channel identification (CID) information, protocol and service multiplexer (PSM) information, maximum transmission unit (MTU) information, or any other such channel information. The first data may further include radio-frequency communication (RFCOMM) link information, such as service channel number (SCN), credits, flow method, or other such link information. The first data may include profile information, such as hands-free status, advanced audio distribution profile (A2DP) information, audio/video remote-control profile (AVRCP) information, serial-port profile (SPP) information, or other such profile information. The first data may also include application-specific information, such as the application context of the first device 110a and/or second device 110b, sensor-related information such as orientation information, and/or configuration information for, for example digital-signal processing (DSP). As mentioned above, the first data may be determined by and/or stored by the connection data component 220.

The first device 110a and/or second device 110b monitor the second wireless connection 114b to detect (506) any change therein and specifically any change that might affect the first data. Alternatively or in addition, the third device 112 may send data to the first device 110a indicating a change in the second wireless connection 114b. For example, the third device 112 may send data indicating a reconfiguring of the A2DP information. The first device 110a may thereafter send, to the second device 110b, data corresponding to the change or changes to the second wireless connection. The first device 110a may send both changed and unchanged data corresponding to the second wireless connection 114 or only changed data. Alternatively or in addition, as described above, the second device 110b may monitor the second wireless connection 114b and determine any changes therein directly. However the change to the second wireless connection 114b is determined, the second device 110b may update (508) the first data based thereon to create updated first data. When the second device 110a later creates the third wireless connection 114c, the updated first data may be used. The second device 110b may not update the first data or may update it any number of times.

The first device 110a and/or second device 110b may detect (510) occurrence of an event corresponding to a change in status of the first device 110a, which event may be referred herein as a handoff-triggering event or a handoff trigger. In various embodiments, the event may be a first battery level of the first device 110a falling below a first threshold (e.g., 5% or 10%) and/or a difference between the first battery level and a second battery level of the second device rising above a second threshold (e.g., second battery level>first battery level by 20%). The event may be a rate of decrease of the first battery level being greater than a threshold. The event may be a velocity or acceleration of the first device 110a being greater than a threshold and a velocity or acceleration of the second device 110b being below the threshold. The event may be an in-ear status of the first device being false and an in-ear status of the second device being true. The in-ear status may be "true" if the device is in the user's ear and "false" if the device is not in the user's ear and may be determined at least in part on data from sensors 318a/b. The event may further be a determination that a signal quality metric corresponding to the wireless signal 113 is greater for the second device 110b than for the first device 110a, as described in greater detail below.

If no event is detected, the first device 110a and/or second device 110b may continue to continually or periodically continue to monitor detection of the event. If, however, the event is detected, the first device 110a may send (512), to the second device 110b, second data corresponding to occurrence of the event. The second data may thus inform the second device 110b to initiate the handover. In response, the second device 110b may send, to the first device 110a, an acknowledgement of receipt of the second data. If the first device 110a does not receive (514) the acknowledgement after a certain amount of time (e.g., 100 milliseconds) after sending the second data, the first device 110a may re-send the second data and wait again for the acknowledgement. If the first device 110a does not receive the acknowledgement after a number of times of sending the second data (e.g., 1-5 times), the first device 110a may halt the process flow and take no further action regarding establishing the third wireless connection 114c.

Once the acknowledgement is received, the first device 110a disconnects (516) the second wireless connection 114b. This disconnecting may include sending, from the first device 110a to the third device 112, packets queued to be sent or otherwise addressed to the third device 112. This sending of packets may be referred to as a draining of packets; the packets may be asynchronous connectionless (ACL) packets. The first device 110a may further send the third device 112 a command to disconnect the second wireless connection 114b and/or a command to pause transmission of further packets. This pause command to cease transmission may be a "flow off" command.

In response to sending the second data and acknowledgement thereof, the first device 110a may change its configuration to correspond to a secondary device, and the second device 110b may change its configuration to correspond to a primary device. The first device 110a may thus thereafter perform steps 140-148 of FIG. 1B, formerly associated with the second device 110b, and the second device 110b may thereafter perform steps 103-140 of FIG. 1A, formerly associated with the first device 110a. Instead of or in addition to sending the acknowledgement of receipt of the second data, the first device 110a and the second device 110b may exchange handshake information associated with the switching of their roles.

The second device 110b establishes (518) the third wireless connection 114c with the third device 112. Establishing the third wireless connection 114c may include sending, from the second device 110b to the third device 112, a resume command to resume sending of packets; this command may be a "flow on" command. Establishing the third wireless connection 114c may further include sending, from the second device 110b to the third device 112, data corresponding to a request to establish the third wireless connection 114c; this request may be a Bluetooth advertisement request. The third wireless connection 114c, like the second wireless connection 114b, may include a BLE and/or EDR connection. The time elapsed between determining occurrence of the event and the establishment of the third wireless connection 114c may be approximately 150-250 milliseconds.

FIG. 5B is a process flow corresponding to an embodiment in which a handoff may be triggered by comparing, by the first device 110a, signal quality metrics determined by the first device 110a and the second device 110b. The first device 110a determines (520) a first signal quality metric $Q_1$ corresponding to a signal quality of a received wireless signal 113 from the third device 112, and the second device 110b determines (522) a second signal quality metric $Q_2$ corresponding to a signal quality of a received wireless signal 113 from the third device 112. As mentioned above, the signal quality metric may be a packet error rate (PER), a received signal strength indication (RSSI), or a signal-to-noise ratio (SNR). The PER may be computed by determining a number of dropped, damaged, or otherwise missing or defective packets (received from the third device 112 via the second wireless connection 114) in a number of received packets, such as 100 packets. The RSSI may be a number from 0-100 indicating a power level of the received wireless signal 113, where 0 indicates no power (i.e., the device 110a/110b received 0% of the power transmitted by the third device 112) and 100 indicates maximum power (i.e., the device 110a/110b received 100% of the power transmitted by the third device 112). As mentioned above, the second device 110b determines the second signal quality metric $Q_2$ without establishing the third wireless connection 114c by monitoring the wireless signal 113—this process may be referred to as "sniffing" or "snooping."

The first device 110a and/or second device 110b may include state machines that compute a running average of the PER for a number of last-received packets, such as 100 or 1000 packets. The state machines of the first and/or second device 110a/110b may compute similar running averages for the RSSI and/or SNR for an amount of time corresponding to the amount of time it takes to receive the number packets (e.g., 100 milliseconds for 100 packets or 1 second for 1000 packets). In some embodiments, the running averages are weighted to emphasize more recently received packets or signal data and to de-emphasize less recently received packets or signal data. For example, the signal quality metric may be weighted such that a shorter, more-recent time period comprises 20% of the average while a longer, less-recent time period comprises 80% of the average. In some embodiments, the more-recent time period corresponds to a time of receipt of a last 100 packets, and the less-recent time period corresponds to a time of receipt of 900 packets received prior to the 100 packets.

The second device 110b may determine and send (524) the second signal quality metric(s) $Q_2$ to the first device 110a at periodic intervals, such as once every 100 milliseconds. The second device 110b may instead or in addition determine and send the second signal quality metric(s) $Q_2$ to the first device 110a in response to a received request from the first device 110a. The second device 110b may further determine a signal quality metric(s) $Q_{2,1}$ and later determine another signal quality metric(s) $Q_{2,2}$; the second device may send the signal quality metric(s) $Q_{2,2}$ to the first device 110a only if it differs from the first signal quality metric(s) $Q_{2,1}$ by a threshold amount, such as 5%. The second device 110b may send the signal quality metric(s) $Q_{2,2}$ upon determining that it differs by more than the threshold amount or at the next periodic interval.

The first device 110a compares (526) the first signal quality metric(s) $Q_1$ to a quality threshold upon receipt of the second signal quality metric $Q_2$ and/or periodically (e.g., every 100 milliseconds). The quality threshold may differ for different signal quality metrics. For example, if the first signal quality metric $Q_1$ is PER, the PER quality threshold may be 10% (i.e., 10% packet loss). If the first signal quality metric $Q_1$ is RSSI, the RSSI quality threshold may be 50 (i.e., the first device 110a receives 50% of power transmitted by the third device). The quality threshold may be fixed or may change dynamically. The first and/or second device 110a/110b may raise the quality threshold when, for example, PER is high or RSSI is low and may lower the quality threshold when, for example, PER is low or RSSI is high.

If the first signal quality metric(s) $Q_1$ ER satisfies the quality threshold (i.e., the PER is less than the PER threshold or the RSSI is greater than the PER threshold), the first device 110a does not trigger (528) the handover and halts the process. If however, the first signal quality metric(s) $Q_1$ does not satisfy the quality threshold (i.e., the PER is greater than the PER threshold or the RSSI is less than the PER threshold), the first device 110a compares (530) the first signal quality metric(s) $Q_1$ and the second signal quality metric(s) $Q_2$. If the second signal quality metric(s) $Q_2$ indicates a better signal quality than the first signal quality metric(s) $Q_1$, the first device 110a determines (532) that a handover trigger is detected and sends (512)—with reference also to FIG. 5A—a role-switch command to the second device 110a.

In some embodiments, the first device 110a applies a hysteresis factor (i.e., a delta factor) when comparing the first signal quality metric(s) $Q_1$ to the quality threshold and/or when comparing the first signal quality metric(s) $Q_1$ to the second signal quality metric(s) $Q_2$. In various embodiments, the delta factor may correspond to a difference of 2% or 3% between the first signal quality metric(s) $Q_1$ and quality threshold and/or the first signal quality metric(s) $Q_1$ and second signal quality metric(s) $Q_2$. The delta factor may thus represent a minimum improvement in signal quality required for the handover—if there would be only a slight improvement in signal quality (e.g, 1%) by triggering a handover, the handover is not triggered. In these embodiments, the first device 110a determines that the first signal quality metric(s) $Q_1$ does not satisfy the quality threshold only if it is greater than (for PER) or less than (for RSSI) the corresponding quality threshold by more than the delta factor. Similarly, the first device 110a may determine that second signal quality metric(s) $Q_2$ indicates a better signal quality than the first signal quality metric(s) $Q_1$ only if the second signal quality metric(s) $Q_2$ is less than (for PER) or greater than (for RSSI) the first signal quality metric(s) $Q_1$ by more than the delta factor. Thus, even if the first signal quality metric(s) $Q_1$ indicates poor signal quality, the first device 110a triggers the handover to the second device 110b only if the second signal quality metric(s) $Q_2$ is not just better than the first signal quality metric(s) $Q_1$, but better than the first signal quality metric(s) $Q_1$ plus the delta factor.

FIG. 5C is a process flow corresponding to an embodiment in which a handoff may be triggered by comparing, by the first device 110a, two signal quality metrics determined by the first device 110a and the second device 110b. The first device 110a determines (540) a first signal quality metric $Q_1$ corresponding to a signal quality of a received wireless signal 113 from the third device 112, and the second device 110b determines (542) a second signal quality metric $Q_2$ corresponding to a signal quality of a received wireless signal 113 from the third device 112. The first device 110a further determines a third signal quality metric $Q_3$ corresponding to another signal quality of the received wireless signal, and the second device 110b further determines a fourth signal quality metric $Q_4$ corresponding to another signal quality of the received wireless signal. The second device 110b sends (544) the second and fourth signal quality metrics $Q_3$ and $Q_4$ to the first device 110a.

The first device 110a, as described above with reference to FIG. 5B, compares (546) the first signal quality metric $Q_1$ to a quality threshold and, if the quality threshold is not satisfied, compares (548) the first signal quality metric $Q_1$ to the second signal quality metric $Q_2$. If the second signal quality metric(s) $Q_2$ does not indicate a better signal quality than the first signal quality metric(s) $Q_1$, (in some embodiments, using the delta factor described above) the first device 110a determines (550) that not handover trigger is detected and halts the process. If, however, the second signal quality metric(s) $Q_2$ does indicate a better signal quality than the first signal quality metric(s) $Q_1$, (in some embodiments, using the delta factor described above), the first device 110a determines (552) a handover trigger is detected and sends (512)—with reference also to FIG. 5A—an indication of the handover to the second device 110a.

In some embodiments, the first device 110a may detect a trigger even if the first signal quality metric $Q_1$ meets the quality threshold if a signal quality associated with the second device 110b is better than that of a signal quality associated with the first device 110a. In other words, even if the second wireless connection 114b between the first device 110a and the third device 112 has an acceptable signal quality (i.e., the first signal quality metric satisfies the quality threshold), the first device 110a will trigger a handover to the second device 110b if the second device 110a is receiving the wireless signal 113 with an even higher quality.

Thus, after the first device 110a determines that the first signal quality metric $Q_1$ satisfies the quality threshold, the first device 110a compares (554) the first signal quality metric $Q_1$ with the second signal quality metric $Q_2$ and/or compares the third signal quality metric $Q_3$ with the fourth signal quality metric $Q_4$. In some embodiments, if either comparison indicates that the wireless signal 113 as received by the second device 110b has a better quality than the second wireless connection 114b, the first device 110a determines (556) whether the second wireless connection 114b is in use. Determining whether the second wireless connection 114b is in use may include determining that audio is being output by the first device 110a and/or that audio is being input to the first device 110a. These determinations may be made by, for example, the first device 110a receiving status information from the third device; this status information may include an audio input and/or audio output status or a status corresponding to an audio input and/or output mode of operation of the device 110a, such as a phone-call mode, music-playing mode, or speech-detection mode. The first device 110a may further determine whether the second wireless connection 114b is in use by examining packets received from and/or sent to the third device 112 and determining that the received and/or sent packets correspond to audio-output packets and/or audio-input packets, or by detecting a wakeword.

If the first device 110 determines that the second wireless connection 114b is in use, the first device does not trigger (550) the handover. If the first device 110 determines that the second wireless connection 114b is not use, the first device trigger (552) the handover. Avoiding triggering the handover while the second wireless connection is in use may prevent errors or glitches in input or output audio.

FIG. 5D is similar to FIG. 5C but uses PER and RSSI as the signal quality metrics. The first device 110a determines (560) a $PER_1$ and a $RSSI_1$ for the second wireless connection 114b, and the second device determines (562) a $PER_2$ and a $RSSI_2$ corresponding to the received wireless signal 113; the second device 110b sends (564) the $PER_2$ and the $RSSI_2$ to the first device 110a. The first device 110a compares (566) the $PER_1$ to a PER quality threshold $PER_{TH}$; if it is greater, and if the first device 110a determines (568) that if the $PER_1$ is less than the $PER_2$ plus a PER delta factor $PER_A$, the first device 110a does not trigger (570) the handover. If, on the other hand, the first device 110a determines that the $PER_1$ is greater than the $PER_2$ plus the $PER_A$, the first device 110a does trigger (572) the handover.

If the first device 110a determines that the $PER_1$ is less than the $PER_{TH}$, the first device 110a further compares (574) the $PER_1$ to the $PER_2$ plus the $PER_A$ and the $RSSI_1$ to the $RSSI_2$ plus a $RSSI_A$. If the $PER_1$ is greater than the $PER_2$ plus the $PER_A$ and/or if the $RSSI_1$ is less than the $RSSI_2$ plus a $RSSI_A$, and if the first device 110a determines (576) that the second wireless connection 114b is not in use, the first device 110a triggers (572) the handover.

FIGS. 5E and 5F are process flows corresponding to embodiments in which other handoff triggers, such as those based on out-of-ear status and battery power level, are considered. In FIG. 5E, the first device 110a first does not detect (580) a handover trigger. The first device 110a may, however, detect a handover trigger (588) if any one of an out-of-ear trigger (582), a low-power trigger (584), and/or a low-signal-quality trigger (586) is determined. In FIG. 5E, the first device 110a may detect the out-of-ear trigger (582) and/or low-power trigger (584) first, and may detect the signal quality trigger (586) only thereafter. In some embodiments, even if the out-of-ear trigger (582) and/or low-power trigger (584) are detected, the system does not trigger the handover (588) if the signal quality of the secondary device is lower than that of the primary device and/or lower than a threshold. In other words, if the device 110a determines that it is out-of-ear and/or low on power, it won't trigger the handover to the second device 110b if the second device has a lower-quality wireless connection. After the handover trigger 588 is detected and, in some embodiments, after the handover process is complete, the first device 110a and/or second device 110b may reset 589 one or more state machines configured to compute the one or more signal quality metrics or corresponding running averages.

Figure 5G:
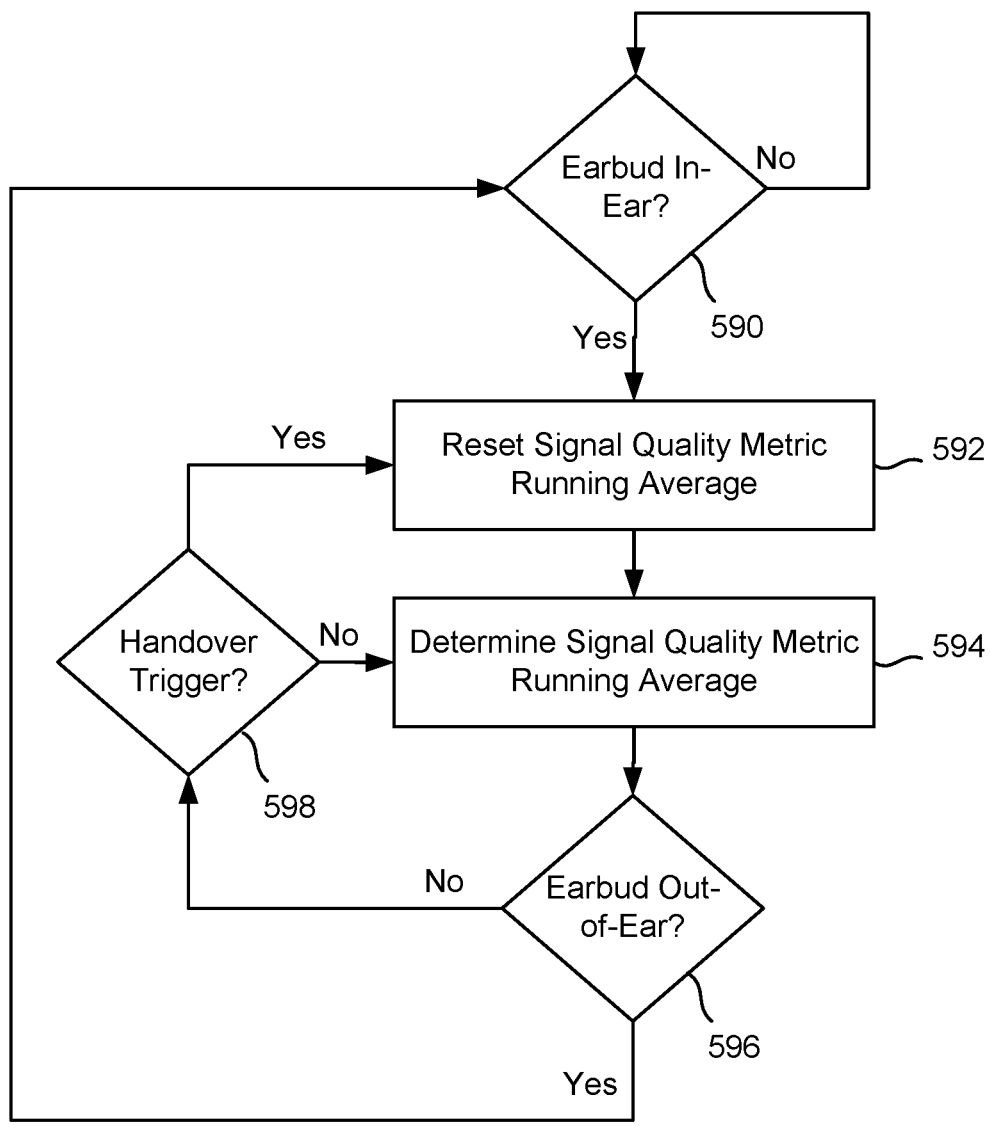

FIG. 5G illustrates a state machine for computing a running average of a signal quality metric in accordance with embodiments of the present invention. In a first step 590, the state machine determines whether the device 110a/110b is in-ear or out-of-ear using the various techniques described herein. If the device 110a/110b is not in-ear, the state machine continues to monitor its in-ear status but takes no further action. Once the device is in-ear, however, the state machine resets (592) a running average associated with a signal quality metric and thereafter determines (594) the running average. If the device 110a/110b is not out-of-ear (596), the state machine continues to compute the running average. If the device 110a/110b is out-of-ear, the state machine resumes monitoring for in-ear status. If a handover trigger is detected (598), the state machine similarly resets the running average.

FIG. 6 illustrates another embodiment of the present invention. As described above, the first wireless connection 114a connects the first device 110a and the second device 110b, and a second wireless connection 114b connects the first device 110a and the third device 112. The second device 110b determines first data 602 regarding the second wireless connection 114b by, as described above, receiving it from the first device 110a and/or by monitoring the second wireless connection 114b. The first device 110a may receive, from the third device 112, data 604 corresponding to a change in the second wireless connection 114b (for example, when a smartphone initiates or detects a change in the second wireless connection) and may forward some or all of this data 606 to the second device 110b. In some embodiments, the second device 110b instead or in addition determines a change in the second wireless connection 114b by monitoring the second wireless connection 114b. The first device 110a determines occurrence of an event corresponding to change in status of the first device 110a, i.e., a handover trigger 608. The first device 110a sends, to the third device 112, a command 610 to pause the second wireless connection 114b (i.e., a "flow off" command"). The first device 110a sends, to the third device 112, any packets 612 queued for or otherwise addressed to the third device 112 (i.e., the packets are drained from the first device 110a The first device 110a sends, to the third device 12, a command 614 to disconnect the second wireless connection 114b.

Figure 8:
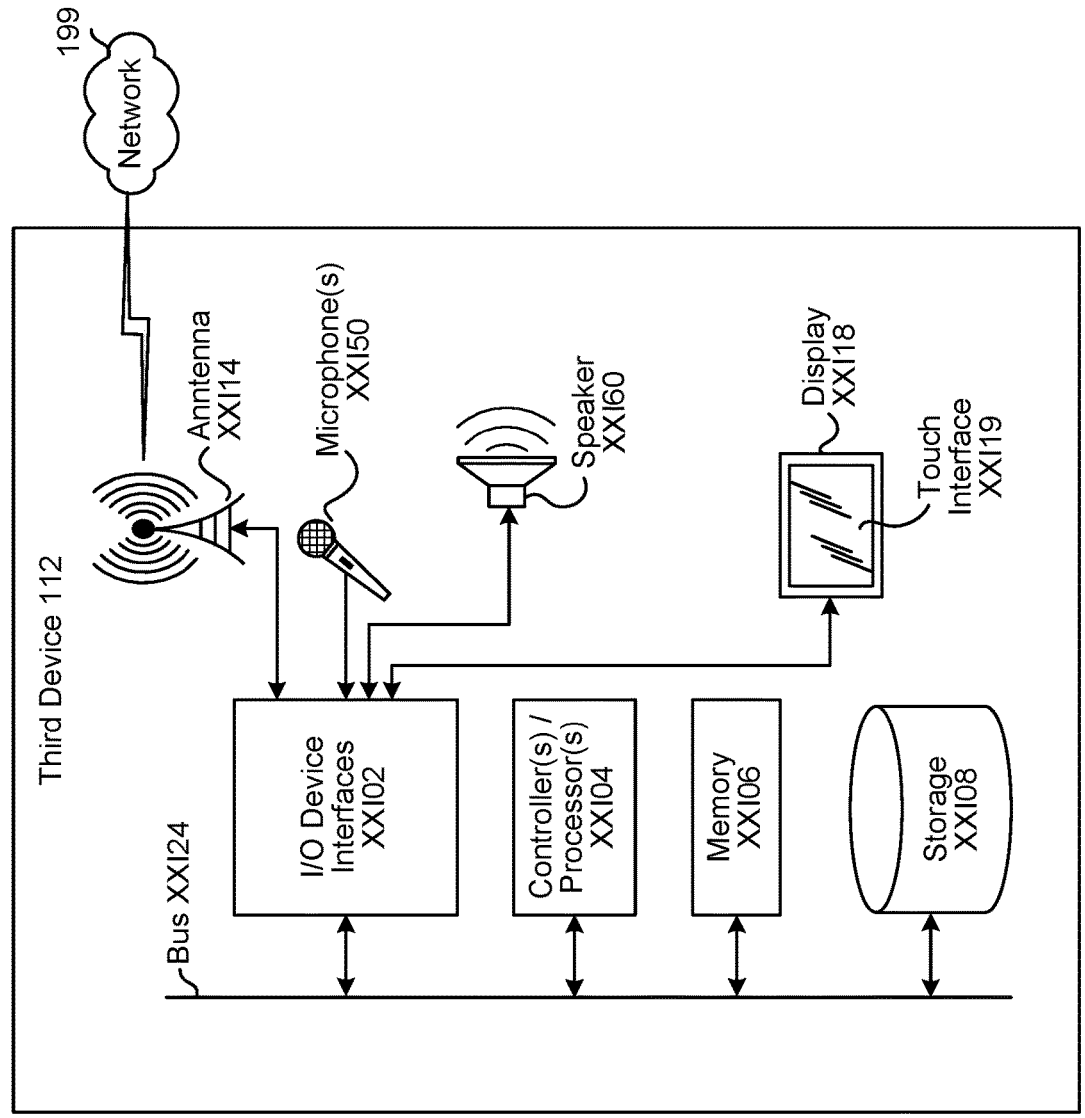
FIG. 8 is a block diagram conceptually illustrating an example user device according to embodiments of the present disclosure.
Figure 9:
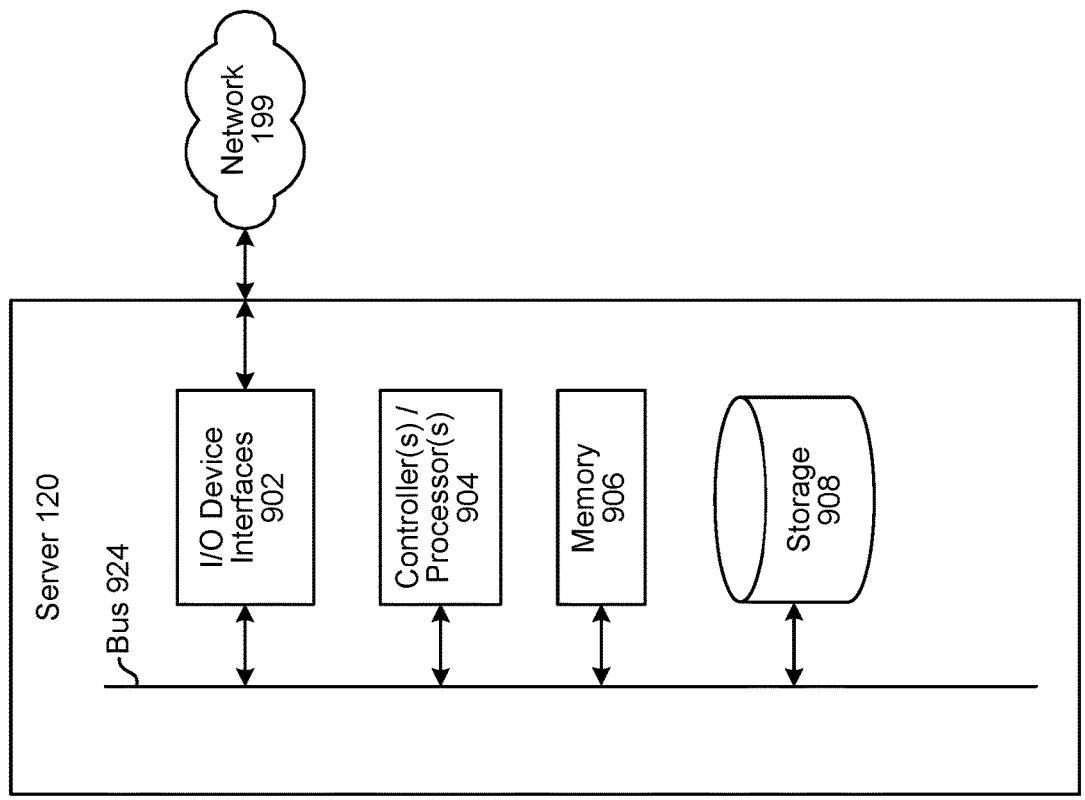
FIG. 9 is a block diagram conceptually illustrating an example remote device according to embodiments of the present disclosure.

The first device may send second data corresponding to role-switch command 616 to the second device 110b, and the second device 110b may send a confirmation of receipt 618 in response. The role-switch command 616 may include, for example, a command informing the second device 110b to begin the handover process. Alternatively or in addition, the first device 110a and second device 110b may exchange handshake information (620); this handshake information may include a request or command to switch roles from primary to secondary and/or from secondary to primary. The handshake information may be sent from the first device 110a to the second device 110b and/or from the second device 110b to the first device 110a. The device receiving handshake information may respond to the sending device with an acknowledgement of receipt. As described above, the first device 110a and second device 110b may switch primary/secondary roles based on these commands. Once the switch is complete, the second device 110b sends a resume command to the third device 112 to resume (622) sending packets (i.e., a "flow on" command) and an advertisement (624). The third device 112 and/or second device 110b may thereafter establish the third wireless connection 114c FIG. 7 is a block diagram conceptually illustrating a first device 110a or second device 110b that may be used with the described system. FIG. 8 is a block diagram conceptually illustrating a third device 112 that may be used with the described system. FIG. 9 is a block diagram conceptually illustrating example components of a remote device, such as a remote server 120, that may assist with ASR, NLU processing, command processing, or the like. Multiple such devices 120 may be included in the system, such as one server(s) 120 for network provisioning, one server(s) for performing ASR, one server(s) 120 for performing NLU, etc. In operation, each of these devices (or groups of devices) may include computer-readable and computer-executable instructions that reside on the respective device (110a/110b/112/120), as will be discussed further below.

Each of these devices (110a/110b/112/120) may include one or more controllers/processors (314/804/904), which may each include a central processing unit (CPU) for processing data and computer-readable instructions and a memory (316/806/906) for storing data and instructions of the respective device. The memories (316/806/906) may individually include volatile random-access memory (RAM), non-volatile read only memory (ROM), non-volatile magnetoresistive (MRAM) memory, and/or other types of memory. Each device may also include a data-storage component (708/808/908), for storing data and controller/processor-executable instructions. Each data-storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (312/802/902).

Computer instructions for operating each device (110a/110b/112/120) and its various components may be executed by the respective device's controller(s)/processor(s) (314/804/904), using the memory (316/806/906) as temporary "working" storage at runtime. A device's computer instructions may be stored in a non-transitory manner in non-volatile memory (316/806/906), storage (708/808/908), or an external device(s). Alternatively, some or all of the executable instructions may be embedded in hardware or firmware on the respective device in addition to or instead of software.

Each device (110a/110b/112/120) includes input/output device interfaces (312/802/902). A variety of components may be connected through the input/output device interfaces, as will be discussed further below. Additionally, each device (110a/110b/112/120) may include an address/data bus (724/824/924) for conveying data among components of the respective device. Each component within a device (110a/110b/112/120) may also be directly connected to other components in addition to (or instead of) being connected to other components across the bus (724/824/924).

For example, via the antenna 310/814, the input/output device interfaces 312/702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Referring to the device 110a/110b/112 of FIGS. 7 and 8, the device 110a/110b/112 may also include input/output device interfaces 31/802 that connect to a variety of components, such as an audio output component like a loudspeaker 302/860 or other component capable of outputting audio. The device 110a/110b/112 may also include an audio capture component which may be, for example, a microphone 304/850 or array of microphones. The microphone 750/850 may be configured to capture audio. The microphones 304a and 304b may be used to determine an approximate distance to a sound's point of origin; acoustic localization, based on time and/or amplitude differences between sounds captured by different microphones of the array, i.e., beam forming, may be performed. The device 110a/110b/112 (using microphone 304/850, wakeword detection module 229, ASR module 250, etc.) may be configured to determine audio data corresponding to detected audio. The device 110a/110b/112 (using input/output device interfaces 312/702, antenna 310/714, etc.) may also be configured to transmit the audio data to server 120 for further processing or to process the data using internal components such as a wakeword detection module 229. As a way of indicating to a user that a wireless connection to another device has been created, the device 110a/110b/112 may be configured with a visual indicator, such as an LED or similar component (not illustrated), that may change color, flash, or otherwise provide visual indications by the device 110a/110b/112. The device 112 may include a display 718, which may comprise a touch interface 719.

The device 110a/110b may include a wakeword detection component 229. The wakeword detection component 229 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110a/110b may be configured collectively to identify a set of the directional audio signals in which the wake expression is detected or in which the wake expression is likely to have occurred.

The wakeword detection component 229 receives captured audio and processes the audio to determine whether the audio corresponds to particular keywords recognizable by the device 110a/110b. The storage 708 may store data relating to keywords and functions to enable the wakeword detection component 229 to perform the algorithms and methods described above. The locally stored speech models may be pre-configured based on known information, prior to the device 110a/110b being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110a/110b prior to the user device 110a/110b being delivered to the user or configured to access the network by the user. The wakeword detection component 229 may access the storage 708 and compare the captured audio to the stored models and audio sequences using audio comparison, pattern recognition, keyword spotting, audio signature, and/or other audio processing techniques.

As noted above, multiple devices may be employed in a single speech processing system. In such a multi-device system, each of the devices may include different components for performing different aspects of the speech processing. The multiple devices may include overlapping components. The components of the first and second devices 110a/110b, third device 112, and server 120, as illustrated in FIGS. 7, 8, and 9, are exemplary, and may be located a stand-alone device or may be included, in whole or in part, as a component of a larger device or system. The concepts disclosed herein may be applied within a number of different devices and computer systems, including, for example, general-purpose computing systems, speech processing systems, and distributed computing environments.

Figure 10:
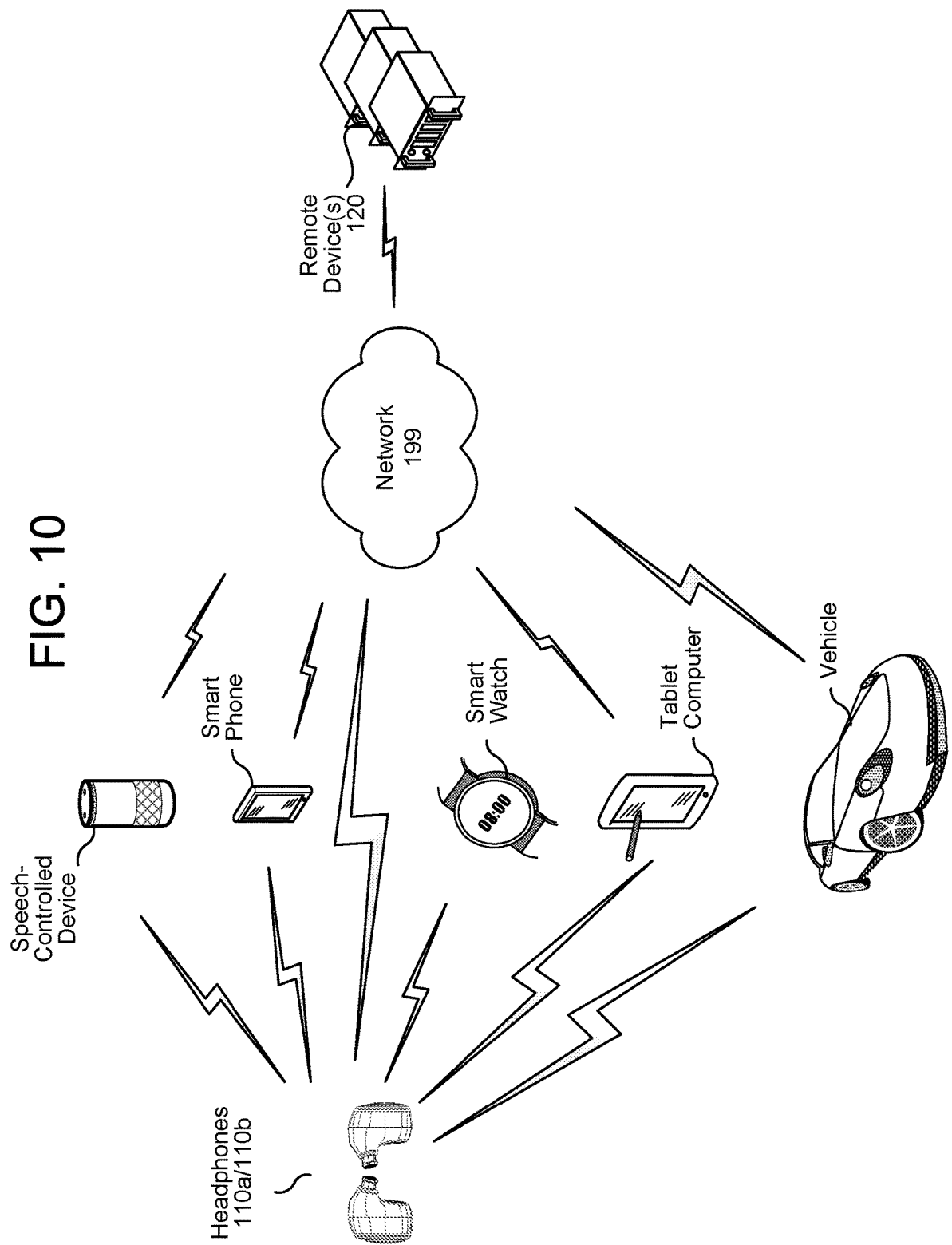
FIG. 10 illustrates an example of a computer network for use with the device provisioning system.

As illustrated in FIG. 10 multiple devices may contain components of the system 100 and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. Headphones 110a/110b may similarly be connected to the remote device(s) 120 either directly or via a network connection to one or more of the local devices. The headphones 110a/110b may capture audio using one or more microphones or other such audio-capture devices; the headphones 110a/110b may perform audio processing, VAD, and/or wakeword detection, and the remove device(s) 120 may perform ASR, NLU, or other functions.

The above aspects of the present disclosure are meant to be illustrative and were chosen to explain the principles and application of the disclosure; they are not intended to be exhaustive or to limit the disclosure. Many modifications and variations of the disclosed aspects may be apparent to those of skill in the art. Persons having ordinary skill in the field of computers, wearable devices, and speech processing will recognize that components and process steps described herein may be interchangeable with other components or steps, or combinations thereof, and still achieve the benefits and advantages of the present disclosure. Moreover, it will be apparent to one skilled in the art that the disclosure may be practiced without some or all of the specific details and steps disclosed herein. As the term is used herein, "component" may be interchanged with similar terms, such as "module" or "engine."

Aspects of the disclosed system may be implemented as a computer method or as an article of manufacture, such as a memory device or non-transitory computer readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    establishing a first wireless connection between a first in-ear device and a second in-ear device;
    establishing, based at least in part on a wireless signal output by a user device, a second wireless connection between the first in-ear device and the user device;
    determining, using the first in-ear device, a first signal quality value of the second wireless connection;
    receiving, from the second in-ear device, a second signal quality value of the wireless signal;
    determining, using the first in-ear device, a first signal strength value of the second wireless connection;
    receiving, from the second in-ear device, a second signal strength value of the wireless signal;
    determining, using the first in-ear device, that the first signal strength value represents a lower signal strength than the second signal strength value;
    determining, using the first in-ear device, that the first signal quality value represents a lower signal quality than the second signal quality value;
    sending, by the first in-ear device to the second in-ear device, a role-switch command; and
    disconnecting the second wireless connection.

2. The computer-implemented method of claim 1, further comprising:
    sending, from the second in-ear device to the first in-ear device, the second signal strength value; and
    based at least in part on receiving the role-switch command, establishing a third wireless connection between the second in-ear device and the user device.

3. The computer-implemented method of claim 2, further comprising at least one of:
    determining, using the second in-ear device and the wireless signal, first configuration information corresponding to the second wireless connection, the first configuration information including a first address of the first in-ear device; or
    receiving, from the first in-ear device at the second in-ear device, second configuration information corresponding to the second wireless connection, the second configuration information including a second address of the first in-ear device,
    wherein the second wireless connection is transferred based at least in part on the first configuration information or the second configuration information.

4. The computer-implemented method of claim 1, further comprising:
    determining, using the first in-ear device, that the first signal quality value is greater than a threshold,
    wherein the first signal quality value is a first packet error rate (PER) and the second signal quality value is a second PER.

5. The computer-implemented method of claim 1, further comprising:
    determining, using the first in-ear device, that the first signal strength value is less than a threshold,
    wherein the first signal strength value is a first received signal strength indicator (RSSI) and the second signal strength value is a second RSSI.

6. The computer-implemented method of claim 1, further comprising:
    establishing, based at least in part on the wireless signal, a third wireless connection between the second in-ear device and the user device;
    determining, using the second in-ear device, that the second signal strength value satisfies a condition quality threshold;
    determining, using the second in-ear device, a third signal strength value of the wireless signal;
    receiving, from using the first in-ear device, a fourth signal strength value of the wireless signal;
    determining, using the first in-ear device, that the third signal strength value is less than the fourth signal strength value; and based at least in part on determining that the third signal strength value is less than the fourth signal strength value, disconnecting the third wireless connection.

7. The computer-implemented method of claim 1, wherein determining that the first signal quality value is lower than the second signal quality value further comprises:
subtracting, from the second signal strength value, a delta factor to generate a modified second signal strength value, the delta factor corresponding to a minimum improvement in signal quality; and
determining that the first signal strength value is lower than the modified second signal strength value.

8. The computer-implemented method of claim 1, wherein determining the first signal quality value further comprises:
determining, during a first time period, a first packet error rate (PER) value corresponding to the second wireless connection;
determining, during a second time period after the first time period, a second PER value corresponding to the second wireless connection;
increasing the second PER value in accordance with a weighting factor to generate a weighted second PER value, the weighting factor corresponding to an emphasis on newer packets; and
determining an average of the first PER value and the weighted second PER value.

9. The computer-implemented method of claim 1, further comprising:
prior to disconnecting the second wireless connection, sending, to the user device from the first in-ear device, a first command to pause the second wireless connection;
sending, to the user device from the first in-ear device, audio data corresponding to an utterance; and
sending, to the user device from the first in-ear device, a second command to resume the second wireless connection.

10. The computer-implemented method of claim 1, further comprising:
determining a status of the first in-ear device, the status corresponding to an in-ear state of the first in-ear device;
determining, using a state machine, a running average of the first signal quality value; and
based at least in part on disconnecting the second wireless connection, resetting the state machine.

11. A system comprising:
at least one processor; and
at least one memory including instructions that, when executed by the at least one processor, cause the system to:
establish a first wireless connection between a first in-ear device and a second in-ear device;
establish, based at least in part on a wireless signal output by a user device, a second wireless connection between the first in-ear device and the user device;
determine, using the first in-ear device, a first signal quality value of the second wireless connection;
receive, from the second in-ear device, a second signal quality value of the wireless signal;
determine, using the first in-ear device, a first signal strength value of the second wireless connection;
receive, from the second in-ear device, a second signal strength value of the wireless signal;
determine, using the first in-ear device, that the first signal strength value represents a lower signal strength than the second signal strength value;
determine, using the first in-ear device, that the first signal quality value represents a lower signal quality than the second signal quality value;
send, by the first in-ear device to the second in-ear device, a role-switch command; and
disconnect the second wireless connection.

12. The system of claim 11, wherein the at least one memory further includes instructions that, when executed by the at least one processor, further cause the system to:
send, from the second in-ear device to the first in-ear device, the second signal quality value; and
based at least in part on receiving the role-switch command, establish a third wireless connection between the second in-ear device and the user device.

13. The system of claim 12, wherein the at least one memory further includes instructions that, when executed by the at least one processor, further cause the system to:
determine, using the second in-ear device and the wireless signal, first configuration information corresponding to the second wireless connection, the first configuration information including a first address of the first in-ear device; or
receive, from the first in-ear device at the second in-ear device, second configuration information corresponding to the second wireless connection, the second configuration information including a second address of the first in-ear device,
wherein the second wireless connection is transferred based at least in part on the first configuration information or the second configuration information.

14. The system of claim 11, wherein the at least one memory further includes instructions that, when executed by the at least one processor, further cause the system to:
determine, using the first in-ear device, that the first signal quality value is greater than a threshold,
wherein the first signal quality value is a first packet error rate (PER) and the second signal quality value is a second PER.

15. The system of claim 11, wherein the at least one memory further includes instructions that, when executed by the at least one processor, further cause the system to:
determine, using the first in-ear device, that the first signal strength value is less than a threshold,
wherein the first signal strength value is a first received signal strength indicator (RSSI) and the second signal strength value is a second RSSI.

16. The system of claim 11, wherein the at least one memory further includes instructions that, when executed by the at least one processor, further cause the system to:
establish, based at least in part on the wireless signal, a third wireless connection between the second in-ear device and the user device;
determine, using the second in-ear device, that the second signal strength value satisfies a condition;
determine, using the second in-ear device, a third signal strength value of the wireless signal;
receive, from the first in-ear device, a fourth signal strength value of the wireless signal;
determine, using the first in-ear device, that the third signal strength value is less than the fourth signal strength value; and
based at least in part on determining that the third signal strength value is less than the fourth signal strength value, disconnect the third wireless connection.

17. The system of claim 11, wherein the at least one memory further includes instructions that, when executed by the at least one processor, further cause the system to:
- determine, during a first time period, a first packet error rate (PER) value corresponding to the second wireless connection;
- determine, during a second time period after the first time period, a second PER value corresponding to the second wireless connection;
- increase the second PER value in accordance with a weighting factor to generate a weighted second PER value, the weighting factor corresponding to an emphasis on newer packets; and
- determine an average of the first PER value and the weighted second PER value.

18. The system of claim 11, wherein the at least one memory further includes instructions that, when executed by the at least one processor, further cause the system to:
- determine a status of the first in-ear device, the status corresponding to an in-ear state of the first in-ear device;
- determine, using a state machine, a running average of the first signal quality value; and
- based at least in part on disconnecting the second wireless connection, reset the state machine.

19. The system of claim 11, wherein the at least one memory further includes instructions that, when executed by the at least one processor, further cause the system to:
- prior to disconnecting the second wireless connection, send, to the user device from the first in-ear device, a first command to pause the second wireless connection;
- send, to the user device from the first in-ear device, audio data corresponding to an utterance; and
- send, to the user device from the first in-ear device, a second command to resume the second wireless connection.

20. The system of claim 11, wherein the at least one memory further includes instructions that, when executed by the at least one processor, further cause the system to:
- determine a status of the first in-ear device, the status corresponding to an in-ear state of the first in-ear device;
- determine, using a state machine, a running average of the first signal quality value; and
- based at least in part on disconnecting the second wireless connection, reset the state machine.

* * * * *